(12) United States Patent
Kuroda et al.

(10) Patent No.: US 9,384,070 B2
(45) Date of Patent: Jul. 5, 2016

(54) DISPLAY INFORMATION GENERATING DEVICE, PROGRAM-EXECUTION STATUS DISPLAY SYSTEM, PROGRAM-EXECUTION STATUS DISPLAY METHOD, AND COMPUTER PROGRAM PRODUCT

(71) Applicant: Kabushiki Kaisha Toshiba, Minato-ku, Tokyo (JP)

(72) Inventors: Akira Kuroda, Yokohama Kanagawa (JP); Hidenori Matsuzaki, Fuchu Tokyo (JP); Mayuko Koezuka, Ohta Tokyo (JP); Nobuaki Tojo, Tachikawa Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/628,559

(22) Filed: Feb. 23, 2015

(65) Prior Publication Data

US 2015/0254115 A1    Sep. 10, 2015

(30) Foreign Application Priority Data

Mar. 5, 2014  (JP) ................................ 2014-042801

(51) Int. Cl.
| | |
|---|---|
| *G06F 3/00* | (2006.01) |
| *G06F 9/44* | (2006.01) |
| *G06F 9/46* | (2006.01) |
| *G06F 13/00* | (2006.01) |
| *G06F 9/54* | (2006.01) |
| *G06F 3/0481* | (2013.01) |
| *G06F 11/00* | (2006.01) |

(52) U.S. Cl.
CPC .............. *G06F 9/542* (2013.01); *G06F 3/0481* (2013.01); *G06F 11/00* (2013.01)

(58) Field of Classification Search
CPC .............................. G06F 3/0481; G06F 9/542
USPC ......................................................... 719/318
See application file for complete search history.

(56) References Cited

U.S. PATENT DOCUMENTS

| | | | | |
|---|---|---|---|---|
| 6,332,212 | B1 * | 12/2001 | Organ et al. | 717/128 |
| 7,310,777 | B2 * | 12/2007 | Cirne | 715/763 |
| 7,478,368 | B2 * | 1/2009 | Hoover et al. | 717/125 |
| 7,533,371 | B1 * | 5/2009 | Johns et al. | 717/130 |
| 7,698,686 | B2 * | 4/2010 | Carroll et al. | 717/125 |
| 7,703,034 | B2 * | 4/2010 | Kornerup et al. | 715/772 |

\* cited by examiner

*Primary Examiner* — Timothy A Mudrick
(74) *Attorney, Agent, or Firm* — Knobbe, Martens, Olson & Bear, LLP

(57) ABSTRACT

A system according to an embodiment is configured to display program execution results with respect to a common axis. The system includes a first unit that acquires event information about two or more events, acquires reference-event identification information to be used in identifying reference events, and generates event objects which represent the events, and a second unit that acquires axis information which represents information about the common axis. The event information contains timing information indicating positions of the events. The first unit sets the reference events as references for the program execution results based on the acquired reference-event identification information, determines display positions of the reference events with respect to the common axis to be same position based on timing information in event information about the reference events, and generates event objects representing the reference events based on the determined display positions with respect to the common axis.

12 Claims, 15 Drawing Sheets

```
if(condition0){
  taskA;          }202
}else{
  taskB;          }203
}
for(i=0; i<3; I++){
  taskC;          }204
  if(condition){
    taskD;        }205
  }else{
    taskE;        }206
    taskF;        }207
  }
}
```

0,1,0,10000,,if0:true:taskA;                        }602

1,1,10000,12000,1,LoopA:iteration:taskC,1;          }603

2,1,12000,13000,,LoopA:iteration:taskD,1;           }604

3,1,13000,15000,2,LoopA:iteration:taskC,2;          }605

4,1,15000,16000,,LoopA:iteration:taskD,2;           }606

5,1,16000,18000,3,LoopA:iteration:taskC,3;          }607

6,1,18000,19000,4,LoopA:iteration:taskE,3;          }608

7,1,19000,20000,5,LoopA:iteration:taskF,3;          }609

8,2,0,1000,,if0:false:taskB;                        }610

9,2,1000,2000,1,LoopA:iteration:taskC,1;            }611

10,2,2000,3000,,LoopA:iteration:taskE,1;            }612

11,2,3000,4000,,LoopA:iteration:taskF,1;            }613

12,2,4000,5000,2,LoopA:iteration:taskC,2;           }614

13,2,5000,6000,,LoopA:iteration:taskE,2;            }615

14,2,6000,7000,,LoopA:iteration:taskF,2;            }616

15,2,7000,8000,3,LoopA:iteration:taskC,3;           }617

16,2,8000,9000,4,LoopA:iteration:taskE,3;           }618

17,2,9000,10000,5,LoopA:iteration:taskF,3;          }619

EXECUTION 1, 1, 0 }703

EXECUTION 2, 2, 100 }704

0,1,1,,if0:true:taskA;               }1202

1,1,2,1,LoopA:iteration:taskC,1;     }1203

2,1,3,,LoopA:iteration:taskD,1;      }1204

3,1,4,2,LoopA:iteration:taskC,2;     }1205

4,1,5,,LoopA:iteration:taskD,2;      }1206

5,1,6,3,LoopA:iteration:taskC,3;     }1207

6,1,7,4,LoopA:iteration:taskE,3;     }1208

7,1,8,5,LoopA:iteration:taskF,3;     }1209

8,2,0,,if0:false:taskB;              }1210

9,2,1,1,LoopA:iteration:taskC,1;     }1211

10,2,2,,LoopA:iteration:taskE,1;     }1212

11,2,3,,LoopA:iteration:taskF,1;     }1213

12,2,4,2,LoopA:iteration:taskC,2;    }1214

13,2,5,,LoopA:iteration:taskE,2;     }1215

14,2,6,,LoopA:iteration:taskF,2;     }1216

15,2,7,3,LoopA:iteration:taskC,3;    }1217

16,2,8,4,LoopA:iteration:taskE,3;    }1218

17,2,9,5,LoopA:iteration:taskF,3;    }1219

EXECUTION 1, 1, 0     }1303

EXECUTION 2, 2, 100   }1304

0,1,0,10000,,if0:true:taskA;   } 1702

1,1,10000,12000,1,LoopA:iteration:taskC;   } 1703

2,1,12000,13000,,LoopA:iteration:taskD;   } 1704

3,1,13000,15000,1,LoopA:iteration:taskC;   } 1705

4,1,15000,16000,,LoopA:iteration:taskD;   } 1706

5,1,16000,18000,1,LoopA:iteration:taskC;   } 1707

6,1,18000,19000,2,LoopA:iteration:taskE;   } 1708

7,1,19000,20000,3,LoopA:iteration:taskF;   } 1709

8,2,0,1000,,if0:false:taskB;   } 1710

9,2,1000,2000,1,LoopA:iteration:taskC;   } 1711

10,2,2000,3000,,LoopA:iteration:taskE;   } 1712

11,2,3000,4000,,LoopA:iteration:taskF;   } 1713

12,2,4000,5000,1,LoopA:iteration:taskC;   } 1714

13,2,5000,6000,,LoopA:iteration:taskE;   } 1715

14,2,6000,7000,,LoopA:iteration:taskF;   } 1716

15,2,7000,8000,1,LoopA:iteration:taskC;   } 1717

16,2,8000,9000,2,LoopA:iteration:taskE;   } 1718

17,2,9000,10000,3,LoopA:iteration:taskF;   } 1719

| | |
|---|---|
| 0,1,1,,if0:true:taskA; | }2002 |
| 1,1,2,1,LoopA:iteration:taskC; | }2003 |
| 2,1,3,,LoopA:iteration:taskD; | }2004 |
| 3,1,4,1,LoopA:iteration:taskC; | }2005 |
| 4,1,5,,LoopA:iteration:taskD; | }2006 |
| 5,1,6,1,LoopA:iteration:taskC; | }2007 |
| 6,1,7,2,LoopA:iteration:taskE; | }2008 |
| 7,1,8,3,LoopA:iteration:taskF; | }2009 |
| 8,2,0,,if0:false:taskB; | }2010 |
| 9,2,1,1,LoopA:iteration:taskC; | }2011 |
| 10,2,2,,LoopA:iteration:taskE; | }2012 |
| 11,2,3,,LoopA:iteration:taskF; | }2013 |
| 12,2,4,1,LoopA:iteration:taskC; | }2014 |
| 13,2,5,,LoopA:iteration:taskE; | }2015 |
| 14,2,6,,LoopA:iteration:taskF; | }2016 |
| 15,2,7,1,LoopA:iteration:taskC; | }2017 |
| 16,2,8,2,LoopA:iteration:taskE; | }2018 |
| 17,2,9,3,LoopA:iteration:taskF; | }2019 |

DISPLAY INFORMATION GENERATING DEVICE, PROGRAM-EXECUTION STATUS DISPLAY SYSTEM, PROGRAM-EXECUTION STATUS DISPLAY METHOD, AND COMPUTER PROGRAM PRODUCT

CROSS-REFERENCE TO RELATED APPLICATIONS

This application is based upon and claims the benefit of priority from Japanese Patent Application No. 2014-042801, filed on Mar. 5, 2014; the entire contents of which are incorporated herein by reference.

FIELD

Embodiments described herein relate generally to a display information generating device, a program-execution status display system, a program-execution status display method, and a computer program product.

BACKGROUND

Conventionally, a technology related to program execution status display is available in which thread objects, which represent threads executed based on the execution traces of a software program, and events are displayed on a two-dimensional plane including a time axis and a thread axis. This technology has an area for displaying the activities regarding the overall execution status of the software program and an area for displaying a detailed execution status of a specific range using the thread axis and the time axis; and provides the user with a function of specifying the specific area from the area for displaying the overall execution status. As a result, detailed information about a specific location can be displayed in an interactive manner from the overall execution status of the software program.

Consider a case in which, during program development, a program developer displays the execution status of the software program for the purpose of confirmation of operations and optimization of the performance. In that case, the program developer understands the changes occurring in the execution of the software program in response to the changes made to the parameters affecting the behavior of the program source code, the input data, and the program execution environment; and accordingly verifies the operations and examines the effects on the performance. Besides, the program developer can figure out the changes occurring in the execution operations of the software program and the changes occurring in the performance in response to the execution of the same software program for a plurality of number of times under the same execution environment; and can accordingly verify the operations and examine the effects on the performance.

BRIEF DESCRIPTION OF THE DRAWINGS

FIG. 2 is a diagram illustrating an exemplary software program used in embodiments;

FIG. 6 is a diagram illustrating an exemplary event information list according to the first embodiment;

FIG. 7 is a diagram illustrating exemplary axis information according to the first embodiment;

FIG. 8 is a diagram illustrating an exemplary reference-event identification information list according to the first embodiment;

FIG. 12 is a diagram illustrating an exemplary event information list according to a second embodiment;

FIG. 13 is a diagram illustrating exemplary axis information according to the second embodiment;

FIG. 14 is a diagram illustrating an exemplary reference-event identification information list according to the second embodiment;

FIG. 17 is a diagram illustrating an exemplary event information list according to a third embodiment;

FIG. 20 is a diagram illustrating an exemplary event information list according to a fourth embodiment;

DETAILED DESCRIPTION

Exemplary embodiments of a display information generating device, a program-execution status display system, a program-execution status display method, and a computer program product are described below is detail with reference to the accompanying drawings.

First Embodiment

Firstly, explained below in detail and with reference to the accompanying drawings is a program-execution status display device (system), which includes a display information generating device (system), according to a first embodiment.

Configuration

Figure 1:
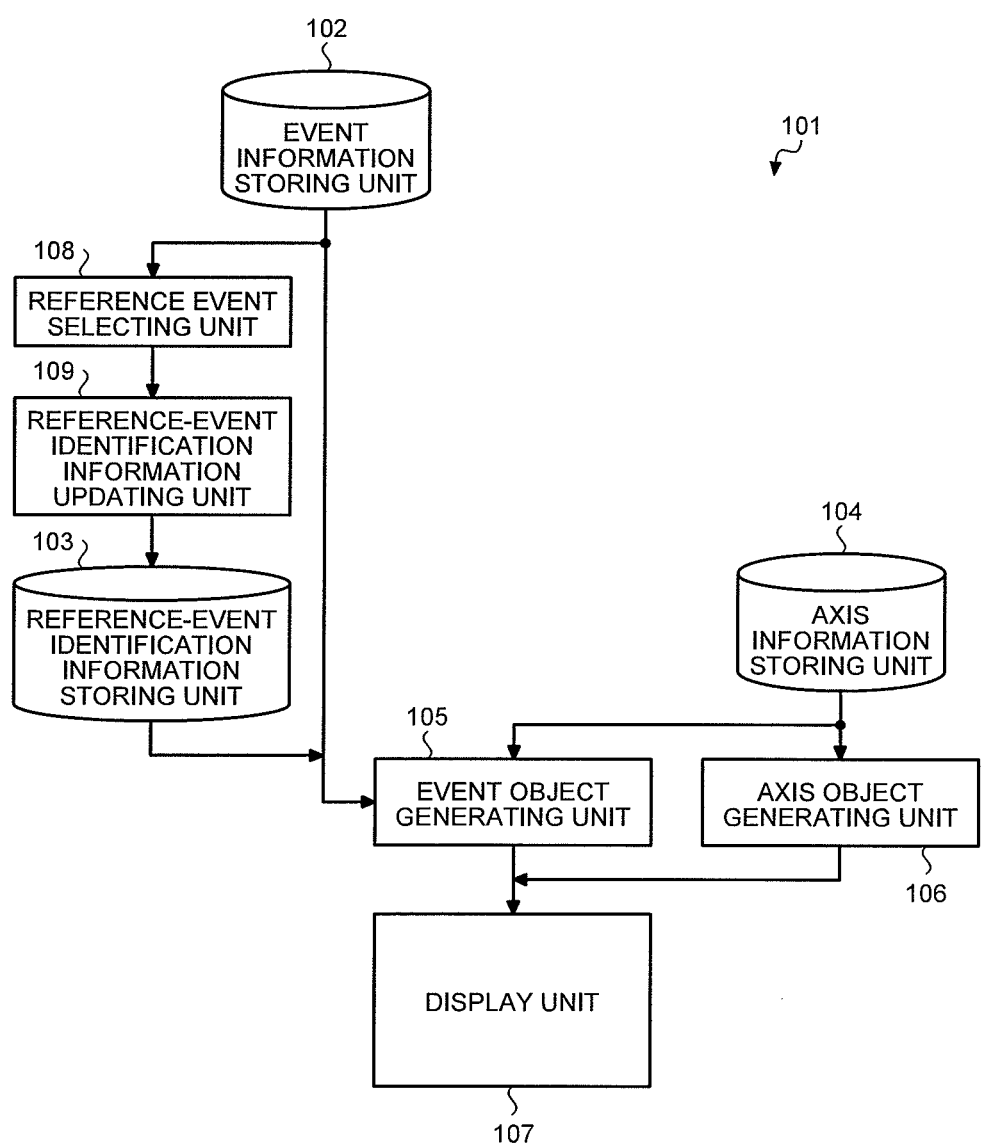
FIG. 1 is a diagram illustrating an overall configuration example of a program-execution status display device according to a first embodiment.

FIG. 1 is a functional block diagram illustrating an overall configuration example of the program-execution status display device (system) according to the first embodiment. As illustrated in FIG. 1, a program-execution status display device (system) 101 according to the first embodiment includes an event information storing unit 102, a reference-event identification information storing unit 103, an axis information storing unit 104, an event object generating unit 105, an axis object generating unit 106, a display unit 107, a reference event selecting unit 108, and a reference-event identification information updating unit 109.

With reference to FIG. 1, the event information storing unit 102 is a memory device used to store at least two sets of event information. Herein, events can represent the units of processing that is performed while executing a software program or a process. For example, event can be the constitutional units of a software program, such as functions, loops, or conditional branches. Alternatively, events can represent specific operations such as memory accessing, command execution, thread generation, or synchronization. Moreover, in this explanation, the sets of event information represent information about the events that are executed during the execution of a software programs. Furthermore, in this explanation, an event information list is a term used to indicate all sets of event information stored in the event information storing unit 102. Meanwhile, as long as the memory device can be used to store data, it can be configured as a storage, a memory, or a buffer.

The axis information storing unit 104 is a memory device used to store axis information that contains display time-series identification information and at least one piece of attribute axis information. Thus, herein, the axis information represents information containing display time-series identification information and at least one piece of attribute axis information. The display time-series identification information contains display time-series unit information per interval of the screen of the display unit 107 and contains display time-series range information indicating the display range. For example, the display time-series unit information can be in the form of period information per display interval; or can be in the form of display interval information per time period; or can be in the form of information containing display intervals and sets of period information represented by those display intervals; or can be in the form of count information per display interval; or can be in the form of display interval information per count. The display time-series range information can be held in advance in the program-execution status display device (system) 101, or can be specified by a software developer, or can be generated based on the screen size of the display unit 107 and the execution period displayed in a single screen, or can be generated based on the window size and the execution period to be displayed in a single screen, or can be generated based on count information displayed in a single screen. Herein, as long as the display time-series range information represents the display range in the time-series axis direction, it serves the purpose. Thus, the display time-series range information can be in the form of information containing display time-series axis start-point information and display time-series axis start-point information; or can be in the form of information containing display time-series axis start-point information and display time-series period information; or can be in the form of information containing display time-series period information and display time-series axis end-point information. The attribute axis information contains attribute-axis element names, program execution identification information, and display position information. The attribute-axis element names represent the information corresponding to the event attributes of all sets of event information listed in an event information list 601. Herein, the attribute axis information can be held in advance in the program-execution status display device (system) 101, or can be specified by a software developer. The display position information indicates the positions of displaying the attribute-axis element names on the screen of the display unit 107. Herein, the display position information can be held in advance in the program-execution status display device (system) 101, or can be specified by a software developer, or can be generated based on the screen size or the window size of the display unit 107 and based on the number of elements of the attribute axis that are to be displayed in a single screen. The attribute axis information indicates the element names of the axis, the execution trace identification information, and the display position information. The execution trace identification information represents an ID that enables identification of a single execution trace from among a plurality of execution traces. Meanwhile, as long as the memory device can be used to store data, it can be configured as a storage, a memory, or a buffer.

The reference-event identification information storing unit 103 is a memory device used to store at least two or more sets of reference event identification information. Herein, a piece of reference event identification information contains at least event identification information. More particularly, a piece of reference event identification information contains such sets of event identification information which do not have identical execution trace identification information. As long as a piece of event identification information enables unique identification of sets of event information, it serves the purpose. For example, sets of the event identification information can be event-specific names, or can be sets of event-specific identification information, or can be numbers assigned in order of execution. In this explanation, a reference-event identification information list is used as the term to represent all sets of reference event information that are stored in the reference-event identification information storing unit 103. Meanwhile, as long as the memory device can be used to store data, it can be configured as a storage, a memory, or a buffer.

The axis object generating unit 106 acquires axis information from the axis information storing unit 104, and generates time-series axis objects and attribute axis objects. Firstly, the axis object generating unit 106 generates time-series axis objects based on display time-series identification information. Moreover, the axis object generating unit 106 generates attribute axis objects which treat element names as labels and arrange the labels based on the display position information.

The event object generating unit 105 acquires an event information list from the event information storing unit 102; acquires a reference-event identification information list from the reference-event identification information storing unit 103; acquires axis information from the axis information storing unit 104; and decides the display positions of event objects, which represent events, by referring to the acquired information. Moreover, based on the event information listed in the event information list, based on the reference event identification information listed in the reference-event identification information list, and based on the axis information; the event object generating unit 105 determines the display sizes of the event objects, which represent events. Herein, an event object points to an object that represents an executed event on the screen, and holds information on the display position on the screen and the display size on the screen.

The reference event selecting unit 108 acquires the event information list from the event information storing unit 102, and selects common event identification information based on a user input and based on the event information written in the event information list. Herein, as long as the user input represents information enabling identification of a single event, it serves the purpose. For example, the user input can be link information about the event objects being displayed and the event information, or can be information that enables identification of a single piece of event information. Moreover, the reference event selecting unit 108 selects, as reference events, user-selected common events from among common events represented by the event information holding the common event identification information. Herein, common events can be defined as the events not only having the same software structure but also having the same execution sequence among the events having the same software structure. In that case, from among one or more event executed in a first execution trace and one or more event executed in a second execution trace that is different than the first execution trace, common events include an event in each trace having at least a single common point. Herein, a common point implies that the information related to events has the same condition. For example, a common point can be the position in the source program, or can be the calling sequence during the execution of a software program or a process, or can be the calling condition, or can be the memory address to be accessed, or can be the execution period, or can be an event having the same core to be executed, or can be a combination of the abovementioned points. Meanwhile, the common event identification information represents an ID that enables unique identification of common events.

The reference-event identification information updating unit 109 acquires the reference event identification information (equivalent to the event identification information included in the event information about the reference events) that enables identification of the reference events selected by the reference event selecting unit 108, and accordingly updates the reference-event identification information list stored in the reference-event identification information storing unit 103.

The display unit 107 acquires axis objects and performs drawing on the screen based on the display information held by the axis objects. Moreover, the display unit 107 acquires the event objects, and performs drawing on the screen based on the display position information held by the event objects. As a result, the event objects get drawn in the plane or the space formed by the axis objects, and the program execution status is presented to the user.

Explained below with reference to a specific example of a software program are the details of the program-execution status display device (system) according to the first embodiment. However, the explanation given below is only exemplary, and the following embodiment is not limited to this example.

In this example, it is assumed that the program-execution status display device (system) displays the execution status when a software program 201 illustrated in FIG. 2 is executed twice. Accordingly, in the first embodiment, the types of events are as follows: a "taskA" 202, a "taskB" 203, a "taskC" 204, a "taskD" 205, a "taskE" 206, and a "taskF" 207.

In a first program-execution example indicating the example of program execution for the first time, a first execution trace (execution 1) of the software program 201 is as follows. Firstly, the "taskA" is executed from a timing "0" to a timing "10000". Then, the "taskC" is executed from the timing "10000" to a timing "12000". Subsequently, the "taskD" is executed from the timing "12000" to a timing "13000". Then, the "taskC" is executed from the timing "13000" to a timing "15000". Subsequently, the "taskD" is executed from the timing "15000" to a timing "16000". Then, the "taskC" is executed from the timing "16000" to a timing "18000". Subsequently, the "taskE" is executed from the timing "18000" to a timing "19000". Then, the "taskF" is executed from the timing "19000" to a timing "20000".

In comparison, in a second program-execution example indicating the example of program execution for the second time, a second execution trace (execution 2) of the software program 201 is as follows. Firstly, the task "taskB" is executed from a timing "0" to the timing "1000". Then, the task "taskC" is executed from the timing "1000" to a timing "2000". Subsequently, the task "taskE" is executed from the timing "2000" to a timing "3000". Then, the task "taskF" is executed from the timing "3000" to a timing "4000". Subsequently, the task "taskC" is executed from the timing "4000" to a timing "5000". Then, the task "taskE" is executed from the timing "5000" to a timing "6000". Subsequently, the task "taskF" is executed from the timing "6000" to a timing "7000". Then, the task "taskC" is executed from the timing "7000" to a timing "8000". Subsequently, the task "taskE" is executed from the timing "8000" to a timing "9000". Then, the task "taskF" is executed from the timing "9000" to a timing "10000".

The program execution status display, which is performed by the program-execution status display device (system) 101 that displays the program execution status as described above, has a time-series axis and an attribute axis. In the first embodiment, the time-series axis can represent a relative execution period with the execution period of the reference events. The attribute axis can have the execution traces, in which events are executed, as elements.

Figure 3:
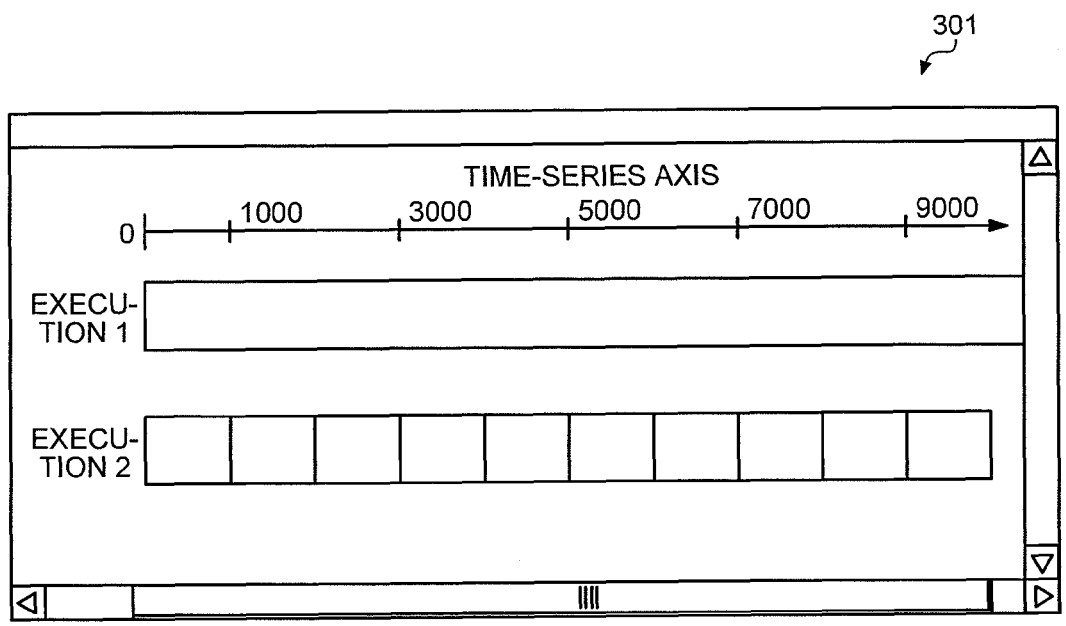
FIG. 3 is a diagram illustrating a first program-execution status display result according to the conventional technology.
Figure 4:
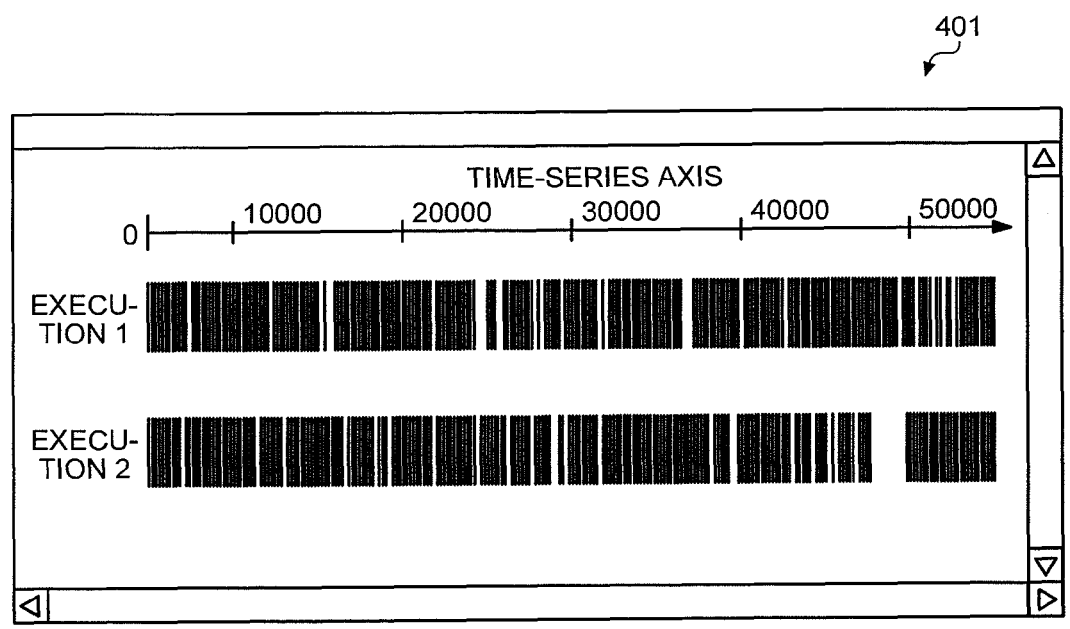
FIG. 4 is a diagram illustrating a second program-execution status display result according to the conventional technology.

Usually, regarding program execution, when the input data is different, or when the execution environment is different, or when the source program is different; there is a change in the behavior of the program execution. For that reason, when a program developer (in the following explanation, called a user) compares the operations using the execution traces, he or she may find a difference in the executed events or a difference in the execution periods. In FIGS. 3 and 4 are illustrated execution status display results of the software program 201 (see FIG. 2) according to the conventional technology. In FIGS. 3 and 4 are illustrated an example in which the first execution trace and the second execution trace are displayed at the same time. In FIGS. 3 and 4, the horizontal axis represents the time-series axis, and the vertical axis represents the attribute axis. The time-series axis represents the execution period. In the attribute axis, the first execution trace is displayed as "execution 1" and the second execution trace is displayed as "execution 2". In such a display method according to the conventional technology, since there is a limit to the display screen size or the display window size of the display unit 107, there are times when it is difficult to simultaneously display all events arranged in the time-series axis direction. In such a case, for example, as illustrated in FIG. 3, there exists a method by which a specific range, which is a part of the entire range, is displayed in a slidable manner using a scroll bar. However, in such a display method, there are times when the common events among the first execution trace and the second execution trace cannot be simultaneously included in the specific range. Consequently, the user cannot visually confirm/review the common events. Moreover, as illustrated in FIG. 4, if the time-series axis is set at a scale at which all events can be simultaneously displayed, then the limitation on the resolution of the display unit 107 results in the collapse of objects each of which represents an event. Hence, there are times when the events cannot be visually distinguished. In that regard, in the first embodiment, the common events in each execution trace are displayed at aligned positions on the time-series axis. That makes it possible for the user to easily understand the differences between a plurality of execution traces.

Figure 5:
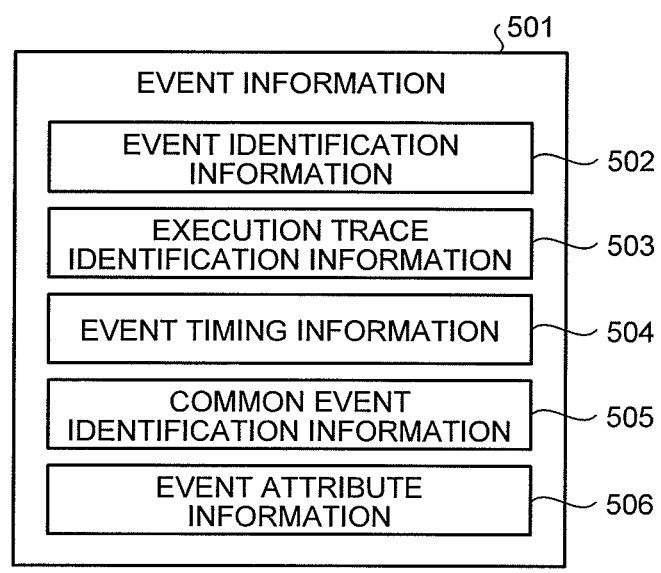
FIG. 5 is a diagram illustrating an exemplary structure of event information according to the first embodiment.

In FIG. 5 is illustrated an exemplary structure of event information. As illustrated in FIG. 5, event information 501 includes event identification information 502, execution trace identification information 503, event timing information 504, common event identification information 505, and event attribute information 506. As described earlier, the event identification information 502 enables unique identification of the corresponding event information. Moreover, as described above, the execution trace identification information 503 represents an ID that enables identification of a single execution trace from among a plurality of execution traces. The event timing information 504 contains timing information about an event. The common event identification information 505 represents an ID that enables unique identification of the common events.

The event timing information 504, which defines timing information about an event, can contain the execution start timing and the execution end timing, or can contain, for example, the execution start timing and the execution period, or can contain the execution period and the execution end timing, or can be the execution sequence of events in each execution trace. Herein, the execution start timing, the execution end timing, and the execution period represent time information, and can be in the form of, for example, the processor time during program execution or time information generated based on the processor time.

The event attribute information 506, which is information related to an event, can be in the form of, for example, program runtime information, or static information about the software program, or execution environment information about the software program. Herein, the program runtime information not only indicates the runtime status obtainable during program execution but also enables identification of the common events. For example, the program runtime information can be information about the processor core that executed the event, or can be information on the command that executed the event, or can be the event execution period, or can be information about the memory access executed by the event, or can be the count of function calls performed by the event, or can be the values of variables in the event, or can be the information about the count of the ongoing iteration if the event is a loop iteration, or can be information about whether the event represents interrupt handling. The static information about the software program represents static information obtainable from a source code or a source code management system. For example, the static information can be position information in the source code, or can be software program structure information, or can be compilation information about the source code, or can be version information about the source code, or can be information about whether the software program is a kernel program, or can be information about whether the software program is a user program. The execution environment information about the software program is the information about the environment in which the software program is executed and can be, for example, the processor core name, or a server name, or server specification information.

An example of the event information 501 is explained with reference to the exemplary structure illustrated in FIG. 5. In the following explanation, the execution trace identification information 503 of the first execution trace ("execution 1") according to the first program-execution example is assumed to be "1" and the execution trace identification information 503 of the second execution trace ("execution 2") according to the second program-execution example is assumed to be "2".

In FIG. 6 is illustrated an example of the event information list generated in the first embodiment when the software program 201 illustrated in FIG. 2 is executed. As illustrated in FIG. 6, the event information list 601 includes a total of 18 sets of event information from event information 602 to event information 619; and a single line represents a single piece of event information. For example, the event information 603 indicates that the event identification information 502 is "1", the execution trace identification information 503 is "1", the execution start timing of the event timing information 504 is "10000", the execution end timing of the event timing information 504 is "12000", the common event identification information 505 is "1", the structure information in the event attribute information 506 in the software program is "LoopA: iteration: taskC", and the iteration information in the event attribute information 506 "1". That is, the event represented by the event information 603 has "1" as the event identification information 502, has "1" as the execution trace identification information 503, and is executed between the execution start timing "10000" to the execution end timing "12000" in the first execution trace. Moreover, the event represented by the event information 603 is a "taskC" event in the "iteration" of "LoopA" in the program structure, and is executed in the first iteration of "LoopA". Furthermore, the event information 603 has "1" as the common event identification information. It implies that the event represented by the event information 603 is a common event with respect to the event represented by the event information 611, which has the same common event identification information.

In FIG. 7 is illustrated an example of the axis information according to the first embodiment when the software program 201 illustrated in FIG. 2 is executed. As illustrated in FIG. 7, axis information 701 includes display time-series identification information 702, attribute axis information 703, and attribute axis information 704. The display time-series identification information 702 indicates that the display time-series unit information is "2", the display time-series range information is "0" and "10000", and the display range from "0" to "10000" is displayed. The attribute axis information 703 is the attribute axis information representing the first execution trace; and has "execution 1" as the element name information, has "1" as the execution trace identification information, and "0" as the display position information. The attribute axis information 704 is the attribute axis information representing the second execution trace; and has "execution 2" as the element name information, has "2" as the execution trace identification information, and "100" as the display position information.

In FIG. 8 is illustrated an example of the reference-event identification information list generated in the first embodiment when the software program illustrated in FIG. 2 is executed. As illustrated in FIG. 8, a reference-event identification information list 801 includes two sets of reference-event identification information 802 and 803. Herein, the reference-event identification information 802 is "1" and the reference-event identification information 803 is "9".

Given below is the detailed explanation of the mechanism of the first embodiment with reference to a specific example.

Firstly, the event object generating unit 105 acquires the event information list 601 that is stored in the event information storing unit 102, acquires the reference-event identification information list 801 that is stored in the reference-event identification information storing unit 103, and acquires the axis information 701 that is stored in the axis information storing unit 104. Meanwhile, the following explanation is given separately for the case in which at least two or more sets of reference-event identification information are registered in the reference-event identification information list 801 and for the case in which no reference-event identification information is registered.

Case in which at Least Two or More Reference Events are Registered

Firstly, the explanation is given about the case in which at least two or more sets of reference-event identification information are registered in the reference-event identification information list 801. In this case, based on the event information list 601 and the reference-event identification information list 801, the event object generating unit 105 identifies the event information about the reference events. Then, the event object generating unit 105 determines such a display start position at which the display start position of a first reference event object, which represents a first reference event in the first execution trace, is same as the display start position of a second reference event object, which represents a second reference event in the second execution trace. Herein, the first reference event and the second reference event represent common events, and are reference events selected by the user.

Subsequently, based on the execution start timing and the execution end timing of the event information about the reference events and based on the display time-series identification information 702 of the axis information, the event object generating unit 105 determines the display sizes in the time-series axis direction of the reference event objects. Moreover, based on the execution trace identification information in the event information about the reference events and the attribute axis information 703 of the axis information, the event object generating unit 105 determines the display positions in the attribute axis direction. Furthermore, the event object generating unit 105 generates reference event objects in such a way that the reference events are displayed according to a display method assigned uniquely to the common event identification information in the event information about the reference events.

Explained below, with reference to a specific example, is an example of generating the reference event objects in the case in which at least two or more sets of reference-event identification information are registered in the reference-event identification information list 801. The event object generating unit 105 sets the event information 603 of the first reference event, which has "1" as the event identification information, and the event information 611 of the second reference event, which has "9" as the event identification information, to have the same positions (for example, "100") along the time-series axis (to have the same display start positions). Herein, a display start position represents the start position information for displaying a reference event. For example, the display start position can be information determined by the program-execution status display device (system) 101, or can be information provided in a file, or can be input information from a user interface, or can be the position on the screen at which the first reference event is being displayed.

Then, the event object generating unit 105 determines the display size of the first reference event having "1" as the event identification information. Moreover, based on the execution start timing "10000" and the execution end timing "12000" of the event information 603 of the first reference event and based on the information "the time unit per display interval is 2" of the display time-series identification information 702 of the axis information, the event object generating unit 105 calculates the display size in the time-series axis direction. More particularly, using an equation "((execution end timing)−(execution start timing))÷(display time-series unit information)", "(12000−10000)÷2" is calculated. As a result, "1000" is obtained as the display size of the first reference event.

Furthermore, based on the execution trace identification information in the event information and execution trace identification information in the attribute axis information in the axis information, the event object generating unit 105 selects the attribute axis information in the axis information and determines the display position in the attribute axis direction. In the first embodiment, the event object generating unit 105 selects the attribute axis information 703 of the axis information having the execution trace identification information equivalent to the execution trace identification information "1" of the event information 603; determines "0" as the display position in the attribute axis direction; determines that display is to be performed with "red" color which is uniquely assigned to the common event identification information in the event information about the reference events; and accordingly generates a reference event object representing the reference event. However, the reference event object representing the reference event is not limited to the uniquely-assigned color, and can be modified in any which way as long as the display format, such as a type of hatching or a type of drawing lines, enables the user to identify the concerned object.

Moreover, the event object generating unit 105 selects the attribute axis information 704 of the axis information having the execution trace identification information equivalent to the execution trace identification information "2" of the event information 611; determines "1" as the display position in the attribute axis direction; determines that display is to be performed with "red" color which is uniquely assigned to the common event identification information in the event information about the reference events; and accordingly generates a reference event object representing the reference event. In an identical manner to the description given above, the reference event object representing the reference event is not limited to the uniquely-assigned color, and can be modified in any which way as long as the display format, such as a type of hatching or a type of drawing lines, enables the user to identify the concerned object.

Explained below, with reference to a specific example, is an example of generating event objects other than the reference event objects (in the following explanation, called non-reference event objects) in the case in which at least two or more sets of reference-event identification information are registered in the reference-event identification information list 801. The event object generating unit 105 acquires the event information list 601 that is stored in the event information storing unit 102, acquires the reference-event identification information list 801 that is stored in the reference-event identification information storing unit 103, and acquires the axis information 701 that is stored in the axis information storing unit 104. Then, based on the event information and the reference event identification information, the event object generating unit 105 identifies the event information about non-reference events. Subsequently, based on the event information about the non-reference events, based on the execution start timing of the reference events having the same execution trace identification information to the non-reference events, and based on the display start positions of the reference event objects of the reference events; the event object generating unit 105 determines the display start positions of non-reference event objects that represent the non-reference events.

Then, based on the execution start timing and the execution end timing of the event information about the non-reference events and based on the display time-series identification information in the axis information, the event object generating unit 105 determines the display sizes in the time-series axis direction of the non-reference event objects. Moreover, based on the execution trace identification information in the event information about the non-reference events and the attribute axis information in the axis information, the event object generating unit 105 determines the display positions in the attribute axis direction. Furthermore, the event object generating unit 105 generates non-reference event objects in such a way that the non-reference events are displayed according to a display method assigned uniquely to the common event identification information in the event information about the non-reference events. Regarding an event object of an event not holding the common event identification information, that event object can be generated in such a way that it is displayed in a different display format than the display format of the event objects of the events having common events. Explained below with examples is the generation of event objects of the events having common events and the generation of event objects of the events not having common events.

In the example of generating event objects of the events having common events in the case in which at least two or more sets of reference-event identification information are registered in the reference-event identification information list 801, the event object generating unit 105 identifies the events not having "1" or "9" as the event identification information to be the non-reference events based on the reference-event identification information list 801. Herein, with reference to the event information 605, the explanation is given about generating an event object of a non-reference event having common events. This non-reference event (the event information 605) has "13000" as the execution start timing and has "1" as the execution trace identification information. Regarding the reference event having "1" as the execution trace identification information, the event information is the event information 603 and the execution start timing is "10000".

Based on the execution start timing "13000" of the non-reference event identified from the event information 605, based on the execution start timing "10000" of the reference event identified from the event information, based on the display time-series identification information 702 of the axis information, and based on the display start position "0" of the event object of the reference event; calculation is done for the display start position of the non-reference event that has common events and that is represented by the event information 605. More particularly, using an equation "{((execution start timing of non-reference event)−(execution start timing of reference event))÷(display time-series unit information)}+display start position of reference event", "{(13000−10000)÷2}+100" is calculated. As a result, "2100" is obtained as the display start position of the non-reference event represented by the event information 605.

Then, based on the execution start timing "13000" and the execution end timing "15000" of the event information 605 of the non-reference reference event and based on the information "the time unit per display interval is 2" of the display time-series identification information 702 of the axis information, the event object generating unit 105 calculates the display size in the time-series axis direction. More particularly, using an equation "((execution end timing)−(execution start timing))÷(display time-series unit information)", "(15000−13000)÷2" is calculated. As a result, "1000" is obtained as the display size of the non-reference event that has common events and that is represented by the event information 605.

More particularly, based on the execution trace identification information "1" of the event information 605 and the attribute axis information 703 of the axis information, the event object generating unit 105 determines "0" as the display position in the attribute axis direction; determines that display is to be performed with "green" color which is uniquely assigned to the common event identification information in the event information about the non-reference events; and accordingly generates a non-reference event object representing the non-reference event. Regarding each other non-reference event holding the common event identification information, a non-reference event object is generated in an identical manner. Meanwhile, the non-reference event object representing the non-reference event holding the common event identification information is not limited to the uniquely-assigned color, and can be modified in any which way as long as the display format, such as a type of hatching or a type of drawing lines, enables the user to identify the concerned object.

Given below is the explanation of an example of generating event objects not having common events in the case in which at least two or more sets of reference-event identification information are registered in the reference-event identification information list 801. Herein, with reference to the event information 612, the explanation is given about generating an event object of a non-reference event not having common events. This non-reference event (the event information 612) has "2000" as the execution start timing and has "2" as the execution trace identification information. Regarding the reference event having "2" as the execution trace identification information, the event information is the event information 611 and the execution start timing is "1000".

The event object generating unit 105 determines the display start positions of the non-reference events. Based on the execution start timing "2000" of the non-reference event identified from the event information 612, based on the execution start timing "1000" of the reference event identified from the event information 611, based on the information "the time unit per display interval is 2" of the display time-series identification information 702 of the axis information, and based on the display start position "0" of the event object of the reference event; calculation is done for the display start position of the non-reference event. More particularly, using an equation "{((execution start timing of non-reference event)−(execution start timing of reference event))÷(time per display interval)}+display start position of reference event", "{(2000−1000)÷2}+100" is calculated. As a result, "600" is obtained as the display start position of the non-reference event that does not have common events and that is represented by the event information 612.

Then, based on the execution start timing "2000" and the execution end timing "3000" of the event information 612 of the non-reference reference event and based on the information "the time unit per display interval is 2" of the display time-series identification information 702 of the axis information, the event object generating unit 105 calculates the display size in the time-series axis direction. More particularly, using an equation "((execution end timing)−(execution start timing))÷(display time-series unit information)", "(3000−2000)÷2" is calculated. As a result, "500" is obtained as the display size of the non-reference event that does not have common events and that is represented by the event information 612.

Moreover, based on the execution trace identification information "2" of the event information 612 and the event timing information 504 of the axis information, the event object generating unit 105 determines "100" as the display position in the attribute axis direction; determines that display is to be performed with "gray" color which is uniquely assigned to such events in the event information for non-reference events which do not hold the common event identification information; and accordingly generates a non-reference event object representing the non-reference event. Regarding each other non-reference event not holding the common event identification information, a non-reference event object is generated in an identical manner. Meanwhile, the non-reference event object representing the non-reference event not holding the common event identification information is not limited to the uniquely-assigned color, and can be modified in any which way as long as the display format, such as a type of hatching or a type of drawing lines, enables the user to identify the concerned object.

Case in which Reference Events are not Registered

Given below is the explanation about the case in which reference-event identification information is not registered in the reference-event identification information list 801. In the case in which not a single piece of reference-event identification information is registered in the reference-event identification information list 801, generation of event objects includes generation of event objects having common events and generation of event objects not having common events.

The event object generating unit 105 selects the events to be displayed based on the execution start timing and the execution period of the event information listed in the event information list 601 and based on the display time-series identification information 702 of the axis information. Then, based on the execution start timing of the event information listed in the event information list 601 and based on the display time-series identification information 702 of the axis information, the event object generating unit 105 determines the display start positions of the event objects representing the events.

Subsequently, based on the execution start timing and the execution period of the event information and based on the display time-series identification information 702 of the axis information, the event object generating unit 105 determines the display sizes of event objects in the time-series direction; and generates event objects in such a way that the events are displayed according to a display method assigned uniquely to the common event identification information based on the common event identification information in the event information. Regarding an event object of an event not holding the common event identification information, that event object can be generated in such a way that it is displayed in a different display format than the display format of the event objects of the events having common events. Explained below with examples is the generation of event objects of the events having common events and the generation of event objects of the events not having common events.

Firstly, the explanation is given about an example of generating event objects of the events having common events in the case in which reference-event identification information is not registered in the reference-event identification information list 801. In this case, with reference to the event information 614, the explanation is focused on an event having common events. The event object generating unit 105 determines whether or not the event represented by the event information 614 should be displayed. Based on the execution start timing "4000" and the execution end timing "5000" of the event information 614 and based on the display time-series range information "0" and "10000" of the display time-series identification information 702; since the event represented by the event information 614 is included in the display range in the time-series axis direction, the event object generating unit 105 determines that the event represented by the event information is to be displayed. That is, the event object generating unit 105 determines to "display" the concerned event object.

Then, the event object generating unit 105 determines the display start position of the event represented by the event information 614. Herein, based on the execution start timing "4000" of the event represented by the event information 614 and based on the information "the time unit per display interval is 2" of the display time-series identification information 702 of the axis information, the event object generating unit 105 calculates the display start position of the event object representing the event information 614. More particularly, using an equation "(execution start timing of event)÷(time per display interval)", "4000÷2" is calculated. As a result, "2000" is obtained as the display start position of the event object representing the event information 614.

Subsequently, the event object generating unit 105 determines the display size of the event represented by the event information 614. Herein, based on the execution start timing "4000" and the execution end timing "5000" of the event information 614 and based on the time-series identification information 702 of the axis information, the event object generating unit 105 calculates the display size of the event represented by the event information 614. More particularly, using an equation "((execution end timing)−(execution start timing))÷(display time-series unit information)", "(5000−4000)÷2" is calculated. As a result, "500" is obtained as the display size of the event object of the event represented by the event information 614.

Then, based on the common event identification information "2" of the event information 614, the event object generating unit 105 generates an event object that is displayed in a different display format than the display formats of other sets of common event identification information. In the first embodiment, the unique display format is expressed by way of a color. Thus, the event object generating unit 105 displays the event represented by the event information 614 in "blue" color. However, the display of the event is not limited to a color, and can be modified in any which way as long as a unique display format, such as a type of hatching or a type of drawing lines, enables the user to identify the concerned object.

Given below is the explanation of an example of generating event objects of the events not having common events in the case in which reference event identification information is not registered in the reference-event identification information list 801. Herein, with reference to the event information 602, the explanation is focused on an event not having common events. The event object generating unit 105 determines whether or not the event represented by the event information 602 should be displayed. Based on the execution start timing "0" and the execution end timing "10000" of the event information 602 and based on the display time-series range information "0" and "10000" of the display time-series identification information 702; since the event represented by the event information 614 is included in the display range in the time-series axis direction, the event object generating unit 105 determines to "display" the concerned event object.

Then, the event object generating unit 105 determines the display start position of the event represented by the event information 602. Herein, based on the execution start timing "0" of the event represented by the event information 602, the event object generating unit 105 sets "0" as the display start position of the event object.

Subsequently, the event object generating unit 105 determines the display size of the event represented by the event information 602. Herein, the event object generating unit 105 compares a display peak timing "10000" with the execution end timing "10000", and determines the display size using earlier of the two timings. In the first embodiment, since the two timings are identical, the event object generating unit 105 determines the display size using the display peak timing "10000". Based on the execution start timing "0" and the execution end timing "10000" of the event information 602 and based on the time-series identification information 702 of the axis information, the event object generating unit 105 calculates the display size of the event represented by the event information 602. More particularly, using an equation "((displayable peak execution end timing)−(execution start timing))÷time per display interval)", "(10000−0)÷2" is calculated. As a result, "5000" is obtained as the display size of the event object of the event represented by the event information 602.

Then, based on the fact that the event information 602 does not hold the common event identification information, the event object generating unit 105 generates an event object displayed in a different display format than the display format of the common events. In the first embodiment, the unique display format is expressed by way of a color. Accordingly, for example, the event represented by the event information 602 is displayed in "gray" color. However, the display of the event is not limited to a color, and can be modified in any which way as long as a unique display format, such as a type of hatching or a type of drawing lines, enables the user to identify the concerned object.

Given below is the explanation about displaying the program execution status made of the axis objects and the event objects generated in the manner described above. Examples of the display of the program execution status include a case in which reference events are not selected and a case in which reference events have been selected.

Case in which Reference Events are not Selected

Firstly, the case in which reference events are not selected is explained below with reference to a program execution status display example illustrated in FIG. 9. In the first embodiment, it is assumed that only the displayable range on the screen is displayed, and that the display area is changed using a scroll bar.

The display unit 107 acquires axis objects, and performs drawing on the screen based on the display information held by the axis objects. As a result, as illustrated in FIG. 9, in a program execution status display example 901, a time-series axis object 920 displays a label of time information in each specific section, and an attribute axis object 921 displays attribute labels. For example, the time-series axis object 920 displays "0" to "10000", and displays the labels in units of 2000. The display unit 107 acquires the display size such as the screen size or the window size, and can display the axis objects of a displayable size or can change the size of the axis objects into a displayable size before displaying them. The attribute axis object 921 displays the label of an attribute axis element 922 and the label of an attribute axis element 923.

The display unit 107 acquires event objects, and performs drawing based on the display position information held by the event objects. As a result, as illustrated in FIG. 9, in the program execution status display example 901, event objects representing the sets of event information 602, 610, 611, 613, 614, 615, 616, 617, 618, and 619 are displayed in that order as event objects 902, 910, 911, 913, 914, 915, 916, 917, 918, and 919, respectively.

Case in which Reference Events have been Selected

The case in which reference events have been selected is explained below with reference to a program execution status display example illustrated in FIG. 9. In the first embodiment, it is assumed that only the displayable range on the screen is displayed, and that the display area is changed using a scroll bar.

In an identical manner to the case in which reference events are not selected, the display unit 107 acquires axis objects and draws them on the screen as well as displays the label of each axis object. A time-series axis object 1020 displays a label of time information in each specific section, and an attribute axis object 1021 displays attribute labels. For example, the time-series axis object 1020 displays "0" to "10000", and displays the labels in units of 2000. The attribute axis object 1021 displays the label of an attribute axis element 1022 and the label of an attribute axis element 1023.

Figure 10:
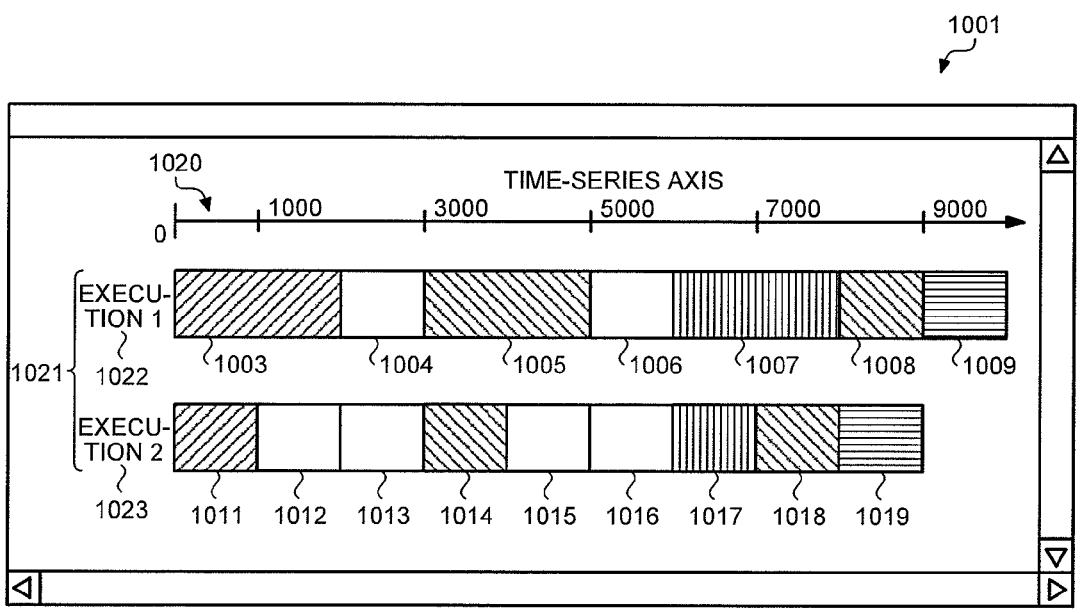
FIG. 10 is a diagram illustrating another program execution status display example according to the first embodiment.

The display unit 107 acquires the reference event objects, and performs drawing based on the display position information held by the reference event objects. As a result, as illustrated in FIG. 10, in a program execution status display example 1001, event objects representing the sets of event information 603, 604, 605, 606, 607, 608, 609, 611, 612, 613, 614, 615, 616, 617, 618, and 619 are displayed in that order as event objects 1003, 1004, 1005, 1006, 1007, 1008, 1009, 1011, 1012, 1013, 1014, 1015, 1016, 1017, 1018, and 1019, respectively.

Specific Example

Figure 9:
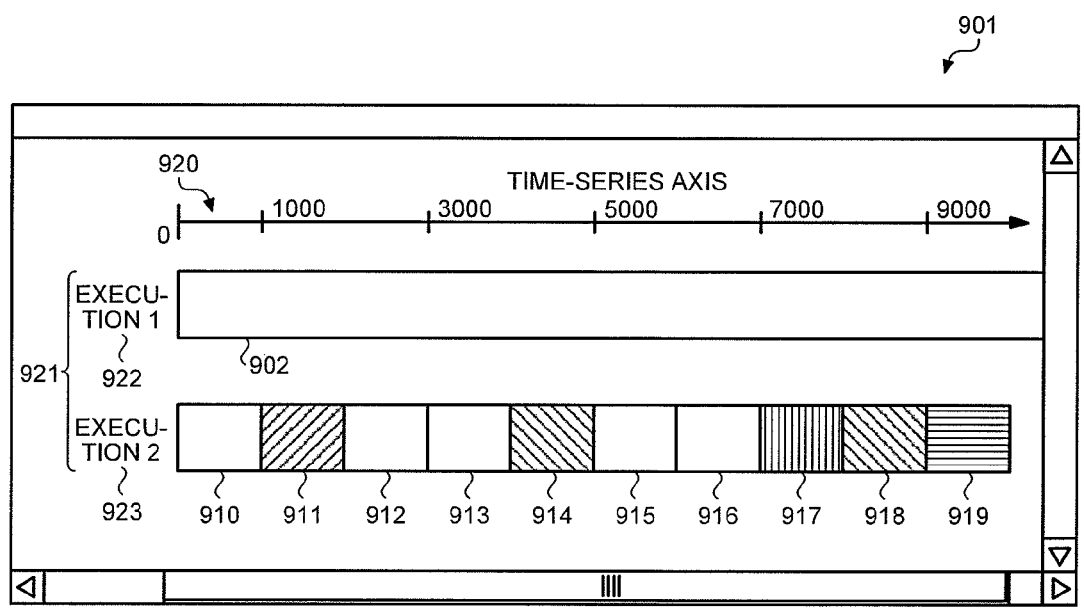
FIG. 9 is a diagram illustrating a program execution status display example according to the first embodiment.

More particularly, in the program execution status display example 901 illustrated in FIG. 9, the events 911, 914, 917, 918, and 919 having common events are displayed as objects using a color other than "gray" color. However, as the unique display format, if a display format other than a color, such as a type of hatching or a type of drawing lines, is implemented; then the event objects can be displayed using the implemented display format that is different than the display format of non-common events not holding the common event identification information. If the event object 911 is selected using a user interface such as a mouse, then the reference event selecting unit 108 selects the common event identification information "1" from the event information 611 of the event object 911. Then, from the event information list 601, the reference event selecting unit 108 selects the sets of event information 603 and 611, which have the common event identification information "1", as the reference events; treats the sets of event identification information "1" and "9" of the selected reference events as the sets of reference event identification information; and stores the reference event identification information in the reference-event identification information storing unit 103. As a result, the program execution status display example 1001 as illustrated in FIG. 10 is displayed.

Regarding the method by which the user specifies the reference events, there is a method of selecting at least one or more events having common events. For example, the reference events can be specified using a file or a user interface.

Operations

Figure 11:
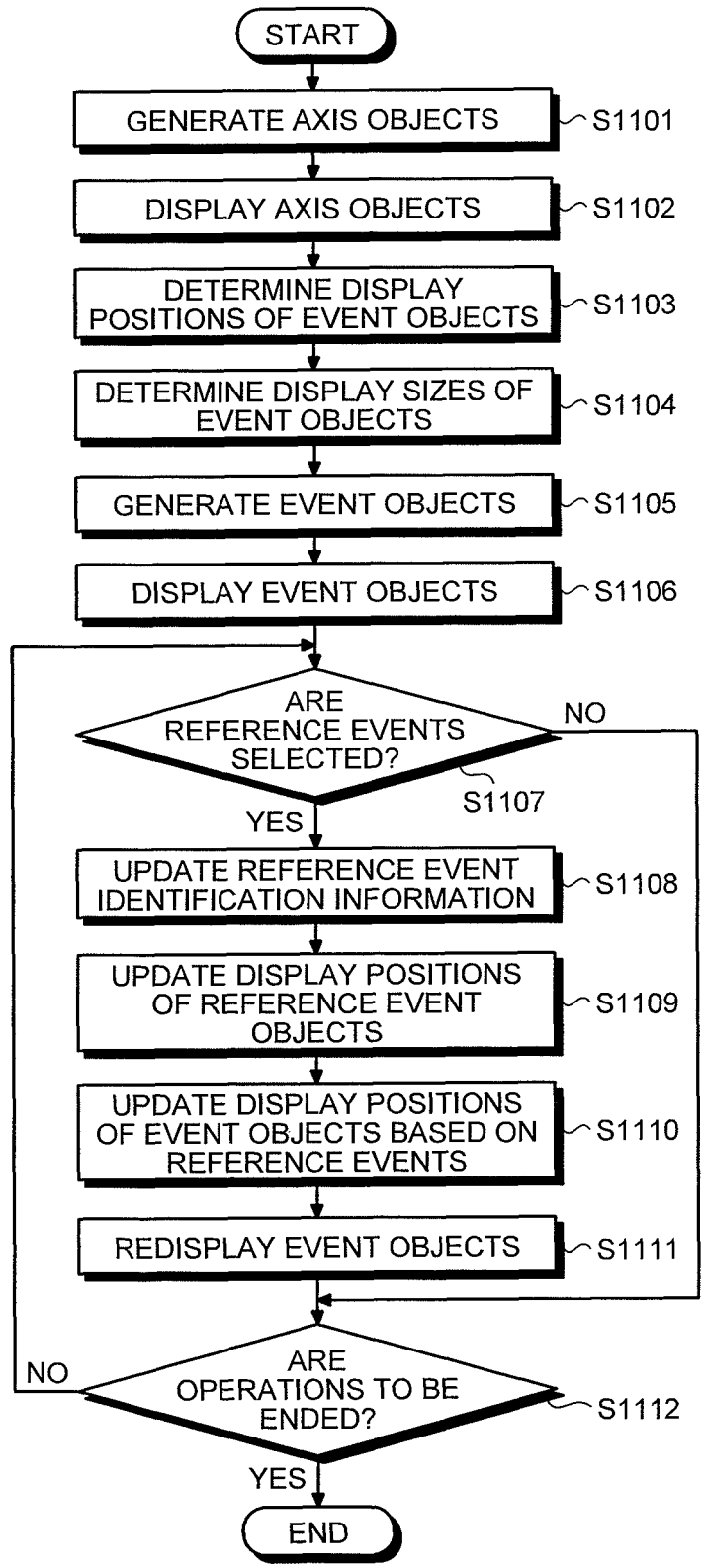
FIG. 11 is a flowchart of operations performed according to the first embodiment.

Explained below in detail with reference to the accompanying drawings are the operations performed in the program-execution status display device (system) 101 according to the first embodiment. FIG. 11 is a flowchart for explaining an example of operations performed in the program-execution status display device (system) 101 according to the first embodiment. As illustrated in FIG. 11, during the operations, firstly, the axis object generating unit 106 acquires the axis information from the axis information storing unit 104 and generates axis objects (Step S1101). Then, the display unit 107 acquires the axis objects, and displays the axis objects on the screen (Step S1102).

Subsequently, during the operations, the event object generating unit 105 acquires the event information from the event information storing unit 102; acquires the reference event identification information from the reference-event identification information storing unit 103; acquires the axis information from the axis information storing unit 104; and determines the display positions of the event objects, which represent the events, from the input information (Step S1103). Then, based on the event information, the reference event identification information, and the axis information; the event object generating unit 105 determines the display sizes of the event objects representing the events (Step S1104). Subsequently, based on the display positions for event objects as determined at Step S1103 and the display sizes of event objects as determined at Step S1104, the event object generating unit 105 generates event objects (Step S1105).

Subsequently, the display unit 107 acquires common event objects and non-common event objects, and displays the common event objects and the non-common event objects on the screen (Step S1106). The displayed event objects can also function as, for example, the user interface. The event objects functioning as the user interface can either include only common event objects or include common event objects as well as non-common event objects.

Then, the reference event selecting unit 108 determines whether or not any of the event objects is selected by the user (Step S1107). If no event object is selected (NO at Step S1107), the system control proceeds to Step S1112. On the other hand, if any event object is selected (YES at Step S1107), then the reference-event identification information updating unit 109 updates the reference event identification information stored in the reference-event identification information storing unit 103 (Step S1108). The user selection of the event objects performed at Step S1107 can be performed using an input device such as a mouse or a keyboard. During the selection, if an already-selected reference event is again selected by the user, then the configuration can be such that another event that is temporally closer to the already-selected reference event can be selected as a reference event. Moreover, a newly-selected event can be the subsequent event in the same program execution trace as the program execution trace of the selected reference event or can be a temporally-close event to the selected reference event but in a different program execution trace.

Then, the event object generating unit 105 acquires the updated reference event identification information, and updates the display positions of the reference event objects representing the reference events identified in the updated reference event identification information (Step S1109). Subsequently, the event object generating unit 105 acquires the reference event objects and the event information and, depending on the display positions of the reference event objects, updates the display positions of the other event objects (Step S1110). In response, the display unit 107 redisplays the event objects according to the updated display positions (Step S1111). Then, the system control proceeds to Step S1112.

Subsequently, the program-execution status display device (system) 101 determines whether or not the operations are to be ended (Step S1112). If the operations are to be ended (YES at Step S1112), then the program-execution status display device (system) 101 ends the operations. On the other hand, if the operations are not to be ended (NO at Step S1112), then the system control returns to Step S1107 and the subsequent operations are performed. Thus, at Step S1107, every time the reference event selecting unit 108 updates the reference event identification information, the operations from Step S1108 to Step S1111 are performed and the event objects are redisplayed according to the updated reference events. During the flow of operations from Step S1108 to Step S1111, the display sizes of the event objects can also be updated as described at Step S1104. Meanwhile, an uncreated event object can be created by performing an identical operation to the operation at Step S1105.

As described above, according to the first embodiment, the execution status of a plurality of execution traces can be effectively presented to the user. Moreover, the execution status of a plurality of execution traces can be presented to the user in an interactive and effective manner. Furthermore, the execution status of an execution trace having a plurality of substantial events can be effectively presented to the user. Moreover, the execution status of an execution trace having a plurality of substantial events can be presented to the user in an interactive and effective manner.

Second Embodiment

Explained below in detail and with reference to the accompanying drawings is a program-execution status display device (system), which includes a display information generating device (system), according to a second embodiment. In the first embodiment, of the axes that constitute the plane or the space for displaying the program execution status, the time-series axis that represents the time-series information is treated as the axis for representing the relative execution period with respect to the execution period of reference events. In contrast, in the second embodiment, the time-series axis is treated as the axis for representing the relative execution sequence with respect to the execution period of reference events.

Configuration and Operations

The program-execution status display device (system) according to the second embodiment can have an identical configuration to the configuration of the program-execution status display device (system) 101 explained with reference to FIG. 1 according to the first embodiment. Moreover, the program-execution status display device (system) according to the second embodiment can have an identical outline of operations to the flowchart explained with reference to FIG. 11 according to the first embodiment. However, in the second embodiment, the size of events in the timer-series axis direction is fixed. Therefore, the operation performed at Step S1104 illustrated in FIG. 11 for fixing the display sizes of the event objects, which represent events, is skipped.

Given below is the explanation of the details of the program-execution status display device (system) according to the second embodiment with reference to a specific example of a software program. However, the explanation given below is only exemplary, and the following embodiment is not limited to this example. Moreover, in the second embodiment, the explanation given in the first embodiment is cited regarding each of the following: the software program, the program execution status display, the events, the common events, the display of differences due to a plurality of execution traces, the event information, execution examples of two software programs, and an example of the common event identification information.

In an identical manner to the event information illustrated in FIG. 5, the event information according to the second embodiment contains event identification information, execution trace identification information, event timing information, common event identification information, and event attribute information. However, in the second embodiment, the event timing information indicates the execution sequence of the events. The other information included in the event information can be identical to the first embodiment.

In FIG. 12 is illustrated an example of an event information list generated in the second embodiment when the software program 201 illustrated in FIG. 2 is executed. As illustrated in FIG. 12, an event information list 1201 includes a total of 18 sets of event information from event information 1202 to event information 1219; and a single line represents a single piece of event information. For example, the event information 1203 indicates that the event identification information is "1", the execution trace identification information is "1", the event timing information is "2", the common event identification information is "1", the structure information in the event attribute information in the software program is "LoopA: iteration: taskC", and the iteration information in the event attribute information is "1". That is, the event represented by the event information 1203 has "1" as the event identification information, has "1" as the execution trace identification information, and is executed in the second instance in the first execution trace. Moreover, the event represented by the event information 1203 is a "taskC" event in the "iteration" of "LoopA" in the program structure, and is executed in the first iteration of "LoopA". Furthermore, the event information 1203 has "1" as the common event identification information. It implies that the event represented by the event information 1203 is a common event with respect to the event represented by the event information 1211, which has the same common event identification information.

Herein, the variations in the event identification information and the variations in the event timing information can be identical to the first embodiment. Similarly, the event attribute information can be identical to the first embodiment. However, in the second embodiment, when the event attribute information represents the program runtime information, it can be information representing the runtime status obtainable during the program execution.

The axis information according to the second embodiment contains, in an identical manner to the first embodiment, the display time-series identification information and the attribute axis information. Herein, the axis attribute information can be identical to the first embodiment. However, in the second embodiment, the display time-series identification information contains the display time-series unit information, which represents the display size per event in the time-series axis direction, and the display time-series range information, which represents the range to be displayed (i.e., the number of events to be displayed). Meanwhile, the variations in the axis information can be identical to the first embodiment.

In FIG. 13 is illustrated an example of the axis information according to the second embodiment when the software program illustrated in FIG. 2 is executed. As illustrated in FIG. 13, axis information 1301 contains display time-series identification information 1302, attribute axis information 1303, and attribute axis information 1304. The display time-series identification information 1302 holds "2" as the display time-series unit information. It implies that the display size per event is two. Regarding the display time-series range information in the display time-series identification information 1302, a time-series axis display start point is set to "1" and a time-series axis display end point is set to "4". Thus, the display time-series range information indicates that the range from "1" to "4" is displayed. The attribute axis information 1303 is the attribute axis information representing the first execution trace; and has "execution 1" as the element name information, "2" as the execution trace identification information, and "0" as the display position information. The attribute axis information 1304 is attribute axis information representing the second execution trace; and has "execution 2" as the element name information, "2" as the execution trace identification information, and "100" as the display position information.

The reference event identification information can be identical to the first embodiment. In FIG. 14 is illustrated an example of the reference-event identification information list that is generated according to the second embodiment when the software program illustrated in FIG. 2 is executed. As illustrated in FIG. 14, reference event identification information list 1401 contains two sets of reference event identification information 1402 and 1403. The reference event identification information 1402 is "3" and the reference event identification information 1403 is "12".

Herein, the event objects can be identical to the first embodiment. However, in the second embodiment, the display size in the time-series axis direction is same for all event objects. For that reason, in the second embodiment, there is no need for a separate step for determining the display size of an event object. In the second embodiment, the determination of the display positions of event objects and the generation of event objects is performed using the event information list 1201 illustrated in FIG. 12, the axis information 1301 illustrated in FIG. 13, and the reference event identification information list 1401 illustrated in FIG. 14. Other than that, the explanation can be identical to the explanation of the event objects according to the first embodiment and the explanation about determination of the display positions of event objects, determination of the display sizes of event objects, and generation of event objects. The following explanation is given separately for the case in which at least two or more sets of reference-event identification information are registered in the reference-event identification information list 1401 and for the case in which no reference-event identification information is registered.

Case in which at Least Two or More Reference Events are Registered

Firstly, the explanation is given about the case in which at least two or more sets of reference-event identification information are registered in the reference-event identification information list 1401. In this case, the event object generating unit 105 identifies the event information about the reference events based on the event information list 1201 and the reference-event identification information list 1401. Then, the event object generating unit 105 determines such a display start position at which the display start position of a first reference event object, which represents a first reference event in the first execution trace, is same as the display start position of a second reference event object, which represents a second reference event in the second execution trace. Herein, the first reference event and the second reference event represent common events, and are reference events selected by the user.

Subsequently, based on the execution sequence of the event information about the reference events and based on the display time-series identification information 1302 of the axis information, the event object generating unit 105 determines the display size in the time-series axis direction of the reference event objects. Moreover, based on the execution trace identification information in the event information about the reference events and the attribute axis information 1303 of the axis information, the event object generating unit 105 determines the display positions in the attribute axis direction. Furthermore, the event object generating unit 105 generates reference event objects in such a way that the reference events are displayed according to a display method assigned uniquely to the common event identification information in the event information about the reference events.

Explained below, with reference to a specific example, is an example of generating the reference event objects in the case in which at least two or more sets of reference-event identification information are registered in the reference-event identification information list 1401. The event object generating unit 105 sets the event information 1205 of the first reference event, which has "1" as the event identification information, and the event information 1214 of the second reference event, which has "12" as the event identification information, to have the same positions (for example, "4") along the time-series axis (to have the same display start positions). Herein, a display start position represents the start position information for displaying a reference event. For example, the display start position can be information determined by the program-execution status display device (system) 101, or can be information provided in a file, or can be input information from a user interface, or can be the position on the screen at which the first reference event is being displayed.

Then, based on the information "the number of events per two display intervals is one" of the display time-series identification information 1302 of the axis information, the event object generating unit 105 sets "2" as the display size per event in the time-series axis direction.

Moreover, based on the execution trace identification information "1" of the event information 1205 and based on the attribute axis information 1303 of the axis information, the event object generating unit 105 determines "0" as the display position in the attribute axis direction; determines that display is to be performed with "red" color which is uniquely assigned to the common event identification information in the event information about the reference events; and accordingly generates a reference event object representing the reference event. However, the reference event object is not limited to the uniquely-assigned color, and can be generated in a display format, such as a type of hatching or a type of drawing lines, that enables the user to identify the concerned object.

Furthermore, based on the execution trace identification information "2" of the event information 1205 and based on the attribute axis information 1303 of the axis information, the event object generating unit 105 determines "100" as the display position in the attribute axis direction; determines that display is to be performed with "red" color which is uniquely assigned to the common event identification information in the event information about the reference events; and accordingly generates a reference event object representing the reference event. However, herein too, the reference event object is not limited to the uniquely-assigned color, and can be generated in a display format, such as a type of hatching or a type of drawing lines, that enables the user to identify the concerned object.

Meanwhile, regarding the example of generating non-reference events in the case in which at least two or more sets of reference-event identification information are registered in the reference-event identification information list 1401, it is possible to have an identical example to the first embodiment. In that regard, a specific example according to the second embodiment is as follows.

In the example of generating event objects of the events having common events in the case in which at least two or more sets of reference-event identification information are registered in the reference-event identification information list 1401; the event object generating unit 105 identifies, based on the reference-event identification information list 1401, the events not having the event identification information "3" or "12" as non-reference events. Herein, with reference to the event information 1207, the explanation is given about generating an event object of a non-reference event having common events. This non-reference event (the event information 1207) has "6" as the execution sequence and has "1" as the execution trace identification information. The event information about the reference event having the same execution trace identification information "1" is the event information 1205, and the execution sequence thereof is "4".

In that regard, firstly, the event object generating unit 105 determines the display start positions of the non-reference events. Based on the execution sequence "6" of the non-reference event that is identified from the event information 1207, based on the execution sequence "4" of reference event that is identified from the event information 1205, and based on the information "the display size per event is two" of the display time-series identification information 1302 of the axis information; calculation is done for the display start position of the non-reference event that has common events and that is represented by the event information 1207. More particularly, using an equation "{((execution sequence of non-reference event)−(execution sequence of reference-event))×(display size per event)}+display start position of reference event", "{(6−4)×2}+4" is calculated. As a result, "8" is obtained as the display start position of the non-reference event that has common events and that is represented by the event information 1207.

Then, based on the information "the display size per event is two" of the display time-series identification information 1302 of the axis information, the event object generating unit 105 sets "2" as the display size in the time-series axis direction of the non-reference event that has common events and that is represented by the event information 1207.

Moreover, based on the execution trace identification information "1" of the event information 1207 and the attribute axis information 1303 of the axis information, the event object generating unit 105 determines "0" as the display position in the attribute axis direction; determines that display is to be performed with "green" color which is uniquely assigned to the common event identification information in the event information about the non-reference events; and accordingly generates a non-reference event object representing the non-reference event. Regarding each other non-reference event holding the common event identification information, a non-reference event object is generated in an identical manner. Meanwhile, the non-reference event object representing the non-reference event holding the common event identification information is not limited to the uniquely-assigned color, and can be generated in a display format, such as a type of hatching or a type of drawing lines, that enables the user to identify the concerned object.

Given below is the explanation of an example of generating event objects not having common events in the case in which at least two or more sets of reference event identification information are registered in the reference-event identification information list 1401. Herein, with reference to the event information 1215, the explanation is given about generating an event object of a non-reference event not having common events. This non-reference event (the event information 1215) has "5" as the execution sequence and has "2" as the execution trace identification information. Regarding the reference event having "2" as the execution trace identification information, the event information is the event information 1214 and the execution sequence is "4".

The event object generating unit 105 determines the display start position of the non-reference event. Based on the execution sequence "5" of the non-reference event identified from the event information 1214, based on the execution sequence "4" of the reference event identified from the event information 1215, based on the information "the display size per event is two" of the display time-series identification information 1302 of the axis information, and based on the display start position "4" of the event object of the reference event; calculation is done for the display start position of the non-reference event that has common events and that is represented by the event information 1214. More particularly, using an equation "{((execution sequence of non-reference event)−(execution sequence of reference-event))×(display size per event)}+display start position of reference event", "{(5−4)×2}+4" is calculated. As a result, "6" is obtained as the display start position of the non-reference event that has common events and that is represented by the event information 1214.

Then, based on the information "the display size per event is two" of the display time-series identification information 1302 of the axis information, the event object generating unit 105 sets "2" as the display size of the non-reference event that has common events and that is represented by the event information 1214.

Moreover, based on the execution trace identification information "2" of the event information 1214 and the attribute axis information 1304 of the axis information, the event object generating unit 105 determines "100" as the display position in the attribute axis direction; determines that display is to be performed with "gray" color which is uniquely assigned to such events in the event information for non-reference events which do not hold the common event identification information; and accordingly generates a non-reference event object representing the non-reference event. Regarding each other non-reference event not holding the common event identification information, a non-reference event object is generated in an identical manner. Meanwhile, the non-reference event object representing the non-reference event not holding the common event identification information is not limited to the uniquely-assigned color, and can be generated in a display format, such as a type of hatching or a type of drawing lines, that enables the user to identify the concerned object.

Case in which Reference Events are not Registered

Given below is the explanation about the case in which reference-event identification information is not registered in the reference-event identification information list 1401. In the case in which not a single piece of reference-event identification information is registered in the reference-event identification information list 1401, generation of event objects includes generation of event objects having common events and generation of event objects not having common events.

Based on the execution sequence of the event information listed in the event information list 1201 and the display time-series identification information 1302 of the axis information, the event object generating unit 105 determines whether or not the events are to be displayed. Moreover, based on the execution sequence of the event information listed in the event information list 1201 and the display time-series identification information 1302 of the axis information, the event object generating unit 105 determines the display start positions of the event objects representing the events.

Then, based on the execution sequence of the event information and the display time-series identification information 1302, the event object generating unit 105 determines the display size in the time-series axis direction of event objects; and generates event objects in such a way that the events are displayed according to a display method assigned uniquely to the common event identification information based on the common event identification information in the event information. Regarding an event object of an event not holding the common event identification information, that event object can be generated in such a way that it is displayed in a different display format than the display format of the event objects of the events having common events. Explained below with examples is the generation of event objects of events having common events and the generation of event objects of events not having common events.

Firstly, the explanation is given about an example of generating event objects of events having common events in the case in which reference-event identification information is not registered in the reference-event identification information list 1401. In this case, the explanation is focused on an event having common events. The event object generating unit 105 determines whether or not the event represented by the event information 1211 should be displayed. Based on the event execution sequence "1" of the event information 1211 and based on display start information "1" and display end information "4" of the display time-series identification information 702 of the axis information; since the event represented by the event information 1211 is included in the display range in the time-series axis direction, the event object generating unit 105 determines to "display" the event represented by the event information 1211.

Then, the event object generating unit 105 determines the display start position of the event represented by the event information 1211. Herein, based on the execution sequence "1" of the event represented by the event information 1205 and based on the information "the display size per event is two" of the display time-series identification information 1302 of the axis information, the event object generating unit 105 calculates the display start position of the event object representing the event information 1211. More particularly, using an equation "(execution sequence of event)×(display size per event)", "1×2" is calculated. As a result, "2" is obtained as the display start position of the event object representing the event information 1211.

Subsequently, the event object generating unit 105 determines the display size of the event represented by the event information 1211. The display size of an event is equivalent to "the display interval per event". For that reason, using the information "the display size per event is two" of the display time-series identification information 1302 of the axis information, the event object generating unit 105 sets "2" as the display size of the event object of the event represented by the event information 1211.

Then, based on the common event identification information "1" of the event information 1211, the event object generating unit 105 generates an event object displayed in a different display format than the display formats of other sets of common event identification information. In the second embodiment, the unique display format is expressed by way of a color. Thus, the event object generating unit 105 displays the event represented by the event information 1211 in "blue" color. However, the display is not limited to the uniquely-assigned color, and an event object having common events can be generated in a display format, such as a type of hatching or a type of drawing lines, which enables the user to identify the concerned event object.

Given below is the explanation about an example of generating event objects of events not having common events in the case in which reference-event identification information is not registered in the reference-event identification information list 1401. In this case, the explanation is focused on the event that does not have common events and that is represented by the event information 1204. The event object generating unit 105 determines whether or not the event represented by the event information 1204 should be displayed. Based on the event execution sequence "4" of the event information 1204 and based on the display start information "1" and the display end information "4" of the display time-series identification information 1302 of the axis information; since the event represented by the event information 1204 is included in the display range in the time-series axis direction, the event object generating unit 105 determines to "display" the event object.

Then, the event object generating unit 105 determines the display start position of the event represented by the event information 1204. The display start position of the event object representing the event information 1204 is calculated based on the execution sequence "3" of the event represented by the event information 1204 and based on the information "the display size per event is two" of the display time-series identification information 1302 of the axis information. More particularly, using an equation "(execution sequence of event)×(display size per event)", "3×2" is calculated. As a result, "6" is obtained as the display start position of the event object representing the event information 1204.

Then, using the information "the display size per event is two" of the time-series information 1302 of the axis information, the event object generating unit 105 sets "2" as the display size of the event object of the event represented by the event information 1204.

Subsequently, based on the fact that the event information 1204 does not hold the common event identification information, the event object generating unit 105 generates an event object displayed in a different display format that the display format of the common event identification information. In the second embodiment, the unique display format is expressed by way of a color. Accordingly, for example, the event represented by the event information 1204 is displayed in "gray" color. However, the display is not limited to the uniquely-assigned color, and the event object not having common events can be generated in a display format, such as a type of hatching or a type of drawing lines, which enables the user to identify the concerned object.

Given below is the explanation about displaying the program execution status made of the axis objects and the event objects generated in the manner described above. Examples of the display of the program execution status include a case in which reference events are not selected and a case in which reference events have been selected.

Case in which Reference Events are not Selected

Firstly, the case in which reference events are not selected is explained below with reference to a program execution status display example illustrated in FIG. 15. In the second embodiment, it is assumed that only the displayable range on the screen is displayed, and that the display area is changed using a scroll bar.

The display unit 107 acquires axis objects, and performs drawing on the screen based on the display information held by the axis objects. As a result, as illustrated in FIG. 9, in a program execution status display example 1501, a time-series axis object 1520 displays a label of time information in each specific section, and an attribute axis object 1521 displays attribute labels. For example, the time-series axis object 1520 displays "1" to "4", and displays the labels in units of single events. The display unit 107 acquires the display size such as the screen size or the window size, and can display the axis objects of a displayable size or can change the size of the axis objects into a displayable size before displaying them. The attribute axis object 1521 displays the label of an attribute axis element 1522 and the label of an attribute axis element 1523.

The display unit 107 acquires event objects, and performs drawing based on the display position information held by the event objects. As a result, as illustrated in FIG. 15, in the program execution status display example 1501, event objects representing the sets of event information 1202, 1203, 1204, 1205, 1210, 1211, 1212, and 1213 are displayed in that order as event objects 1502, 1503, 1504, 1505, 1510, 1511, 1512, and 1513, respectively.

Case in which Reference Events have been Selected

Figure 16:
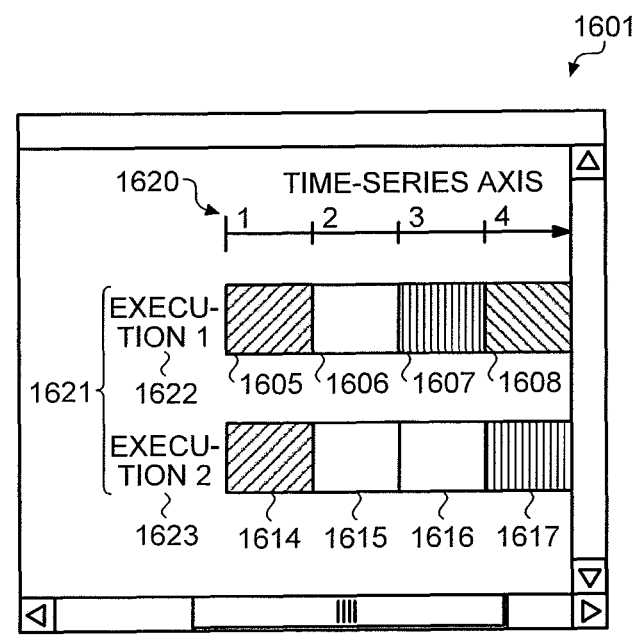
FIG. 16 is a diagram illustrating another program execution status display example according to the second embodiment.

The case in which reference events have been selected is explained below with reference to a program execution status display example illustrated in FIG. 16. In the second embodiment, it is assumed that only the displayable range on the screen is displayed, and that the display area is changed using a scroll bar.

In an identical manner to the case in which reference events are not selected, the display unit 107 acquires axis objects and draws them on the screen as well as displays the label of each axis object.

The display unit 107 acquires the reference event objects, and performs drawing based on the display position information held by the reference event objects. As a result, as illustrated in FIG. 16, in a program execution status display example 1601, a time-series axis object 1620 displays a label of time information in each specific section, and an attribute axis object 1621 displays attribute labels. For example, the time-series axis object 1620 displays "1" to "4", and displays the labels in units of single events. The display unit 107 acquires the display size such as the screen size or the window size, and can display the axis objects of a displayable size or can change the size of the axis objects into a displayable size before displaying them. The attribute axis object 1621 displays the label of an attribute axis element 1622 and the label of an attribute axis element 1623. Moreover, in the program execution status display example 1601, event objects representing the sets of event information 1205, 1206, 1207, 1208, 1214, 1215, 1216, and 1217 are displayed in that order as event objects 1605, 1606, 1607, 1608, 1614, 1615, 1616, and 1617, respectively.

Specific Example

Figure 15:
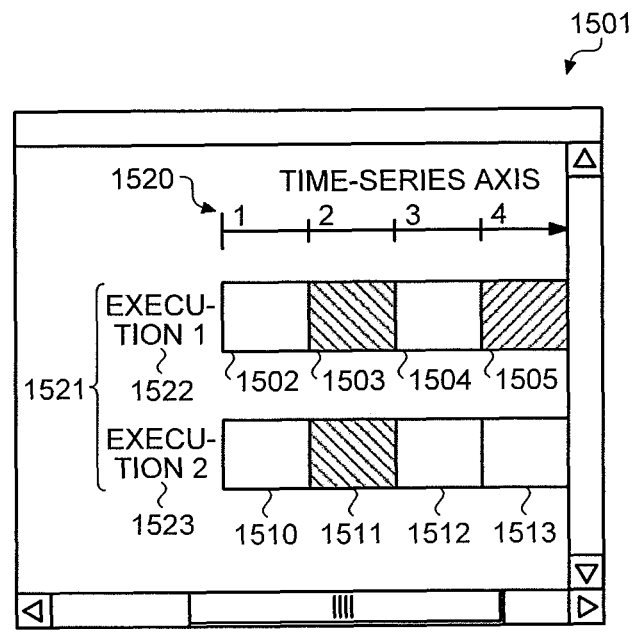
FIG. 15 is a diagram illustrating a program execution status display example according to the second embodiment.

More particularly, in the program execution status display example 1501 illustrated in FIG. 15, the event objects 1503, 1505, and 1511 having common events are displayed as objects using a color other than "gray" color. However, as the unique display format, if a display format other than a color, such as a type of hatching or a type of drawing lines, is implemented; then the event objects can be displayed using the implemented display format that is different than the display format of non-common events not holding the common event identification information. If the event object 1505 is selected using a user interface such as a mouse, then the reference event selecting unit 108 selects the common event identification information "2" from the event information 1205 of the event object 1505. Then, from the event information list 1201, the reference event selecting unit 108 selects the sets of event information 1205 and 1214, which have the common event identification information "2", as the reference events; treats the sets of event identification information "3" and "12" of the selected reference events as the sets of reference event identification information; and stores the reference event identification information in the reference-event identification information storing unit 103. As a result, the program execution status display example 1601 as illustrated in FIG. 16 is displayed.

Regarding the method by which the user specifies the reference events, there is a method of selecting at least one or more events having common events. For example, the reference events can be specified using a file or a user interface.

As described above, according to the second embodiment, in an identical manner to the first embodiment, the execution status of a plurality of execution traces can be effectively presented to the user. Moreover, the execution status of a plurality of execution traces can be presented to the user in an interactive and effective manner. Furthermore, the execution status of an execution trace having a plurality of substantial events can be effectively presented to the user. Moreover, the execution status of an execution trace having a plurality of substantial events can be presented to the user in an interactive and effective manner.

Third Embodiment

Explained below in detail and with reference to the accompanying drawings is a program-execution status display device (system), which includes a display information generating device (system), according to a third embodiment. In the third embodiment, the explanation is given for an example in which, in the program-execution status display device (system) according to the first embodiment, a plurality of reference events is present in the same execution trace.

Configuration and Operations

The program-execution status display device (system) according to the third embodiment can have an identical configuration to the configuration of the program-execution status display device (system) 101 explained with reference to FIG. 1 according to the first embodiment. Moreover, the program-execution status display device (system) according to the third embodiment can have an identical outline of operations as the flowchart explained with reference to FIG. 11 according to the first embodiment.

Given below is the explanation of the details of the program-execution status display device (system) according to the third embodiment with reference to a specific example of a software program. However, the explanation given below is only exemplary, and the following embodiment is not limited to this example. Moreover, in the third embodiment, the explanation given in the first embodiment is cited regarding each of the following: the software program, the program execution status display, the events, the common events, the display of differences due to a plurality of execution traces, the event information, execution examples of two software programs, an example of the common event identification information, an example of the event information, variations in the event identification information, variations in the event timing information, variations in the event attribute information, the axis information, an example of the axis information, variations in the axis information, the reference event identification information, an example of the reference event identification information, the event objects, the determination of the display positions of the event objects, the determination of the display sizes of the event objects, and the generation of the event objects (including an example of generation of the reference event objects in the case in which at least two or more reference events are registered and in the case in which reference events are not registered and including an example of generation of the other event objects (including an example of generation of the event objects having common events and an example of generation of the event objects not having common events)). However, in the third embodiment, instead of the generation of the event information list 601 illustrated in FIG. 6, an event information list 1701 illustrated in FIG. 17 is generated. The event information list 1701 illustrated in FIG. 17 includes sets of event information 1703, 1705, 1707, 1711, 1714, and 1717 as the sets of event information having the same common event identification information "1". Consider a case in which the reference event selecting unit 108 selects, as a reference event, the event corresponding to any one of the sets of event information 1703, 1705, 1707, 1711, 1714, and 1717; and the reference-event identification information storing unit 103 has the event information about the selected event stored therein as well as has the event identification information about the selected event, from among the events holding the common event identification information "1", stored therein.

Given below is the explanation about displaying the program execution status made of the axis objects and the event objects generated according to the third embodiment. Examples of the display of the program execution status include a case in which reference events are not selected and a case in which reference events have been selected.

Case in which Reference Events are not Selected

Firstly, the case in which reference events are not selected is explained below with reference to a program execution status display example illustrated in FIG. 18. In the third embodiment, it is assumed that only the displayable range on the screen is displayed, and that the display area is changed using a scroll bar. Moreover, in the third embodiment, the display of axis objects is identical to the first embodiment.

The display unit 107 acquires event objects, and performs drawing based on the display position information held by the event objects. As a result, as illustrated in FIG. 18, in a program execution status display example 1801, a time-series axis object 1820 displays a label of time information in each specific section, and an attribute axis object 1821 displays attribute labels. For example, the time-series axis object 1820 displays "0" to "1000", and displays the labels in units of 2000. The display unit 107 acquires the display size such as the screen size or the window size, and can display the axis objects of a displayable size or can change the size of the axis objects into a displayable size before displaying them. The attribute axis object 1821 displays the label of an attribute axis element 1822 and the label of an attribute axis element 1823. Moreover, in the program execution status display example 1801, event objects representing the sets of event information 1702, 1710, 1711, 1712, 1713, 1714, 1715, 1716, 1717, 1718, and 1719 are displayed in that order as event objects 1802, 1810, 1811, 1812, 1813, 1814, 1815, 1816, 1817, 1818, and 1819, respectively.

Figure 19:
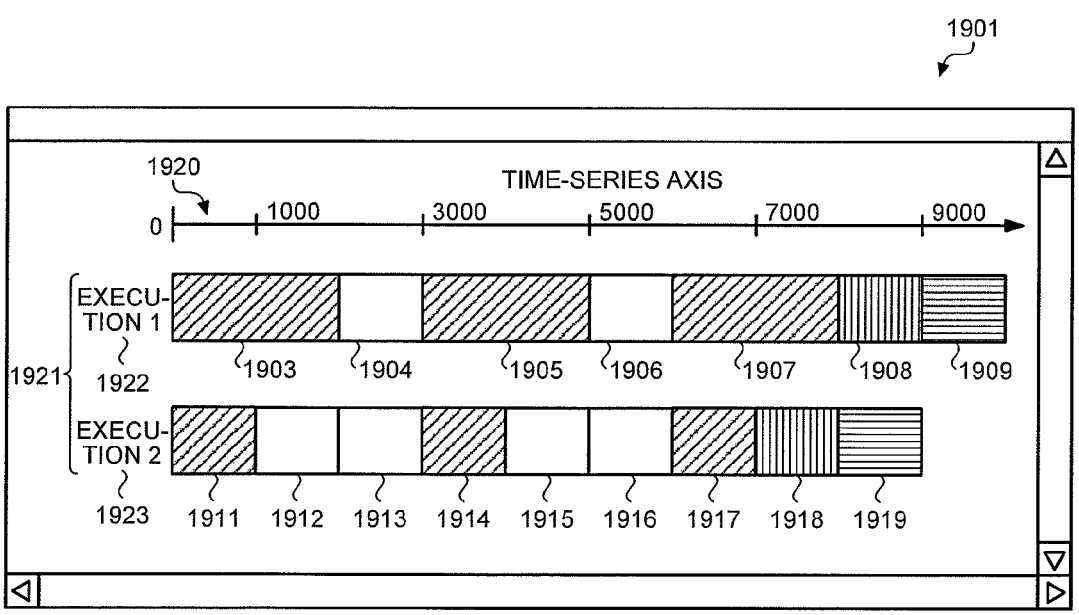
FIG. 19 is a diagram illustrating another program execution status display example according to the third embodiment.

The case in which reference events have been selected is explained below with reference to a program execution status display example illustrated in FIG. 19. In the third embodiment, it is assumed that only the displayable range on the screen is displayed, and that the display area is changed using a scroll bar. Moreover, in the third embodiment, the display of axis objects is identical to the first embodiment.

The display unit 107 acquires the reference event objects, and performs drawing based on the display position information held by the reference event objects. As a result, as illustrated in FIG. 19, in a program execution status display example 1901, a time-series axis object 1920 displays a label of time information in each specific section, and an attribute axis object 1921 displays attribute labels. For example, the time-series axis object 1920 displays "0" to "1000", and displays the labels in units of 2000. The display unit 107 acquires the display size such as the screen size or the window size, and can display the axis objects of a displayable size or can change the size of the axis objects into a displayable size before displaying them. The attribute axis object 1921 displays the label of an attribute axis element 1922 and the label of an attribute axis element 1923. Moreover, in the program execution status display example 1901, event objects representing the sets of event information 1703, 1704, 1705, 1706, 1707, 1708, 1709, 1711, 1712, 1713, 1714, 1715, 1716, 1717, 1718, and 1719 are displayed in that order as event objects 1903, 1904, 1905, 1906, 1907, 1908, 1909, 1911, 1912, 1913, 1914, 1915, 1916, 1917, 1918, and 1919, respectively.

Specific Example

Figure 18:
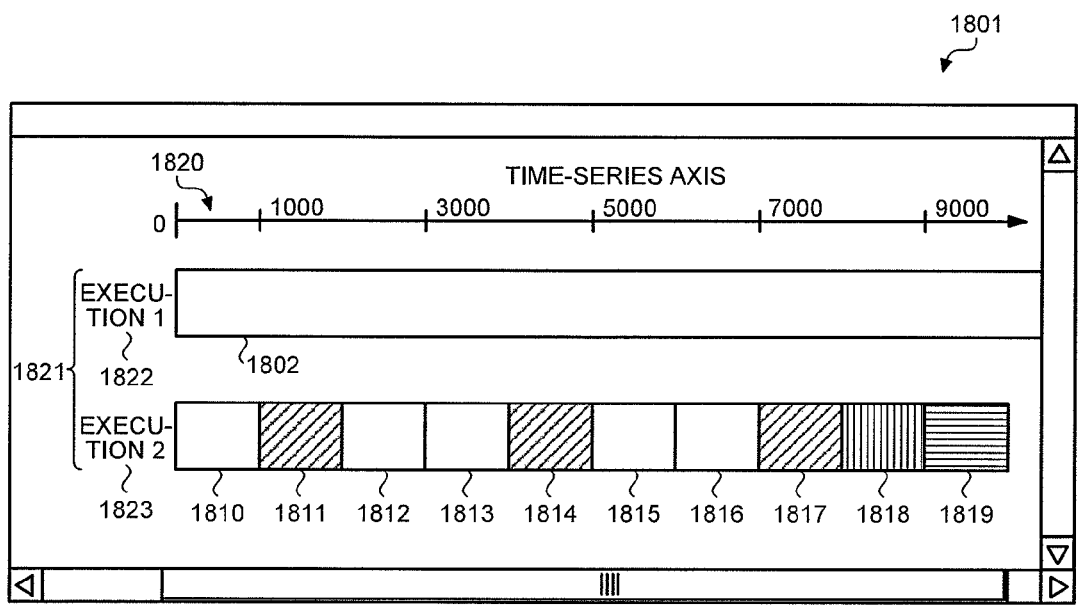
FIG. 18 is a diagram illustrating a program execution status display example according to the third embodiment.

More particularly, in the program execution status display example 1801 illustrated in FIG. 18, the event objects 1811, 1814, 1817, 1818, and 1819 having common events are displayed as objects using a color other than "gray" color. However, as the unique display format, if a display format other than a color, such as a type of hatching or a type of drawing lines, is implemented; then the event objects can be displayed using the implemented display format that is different than the display format of non-common events not holding the common event identification information. If the event object 1811 is selected using a user interface such as a mouse, then the reference event selecting unit 108 extracts the common event identification information "1" and the execution trace identification information "2" from the event information 1711 of the event object 1811. Then, from the event information list 1701, the reference event selecting unit 108 selects the sets of event information 1703, 1705, and 1707, which have the execution trace identification information other than "2" and which have the common event identification information "1", as the reference events. In the selected sets of event information, if there is a plurality of sets of event information having the same execution trace identification information, then the reference event selecting unit 108 selects a single piece of event information for each piece of execution trace identification information. In this specific example, based on reference event selection condition information, from among the sets of event information 1703, 1705, and 1707, the event represented by the event information 1703, which has the execution start timing "10000" that is closest to the execution start timing "1000" of the event information 1711 selected as the reference event in another execution trace, is selected as the reference event. As a result, in the reference-event identification information storing unit 103, the event identification information "1" of the event information 1703 and the event identification information "9" of the event information 1711 are stored as sets of the reference event identification information.

Regarding the method of specifying the reference events, there is a method of selecting at least one or more events having common events. For example, the reference events can be specified using a file or a user interface.

Meanwhile, the reference event selection condition information points to a condition that enables selection of a single common event from among the common events having the same common event identification information. Thus, the common event selected according to the reference event selection condition information is, for example, a common event in a different execution trace than the execution trace of the user-selected common event; and can be the common event having the closest execution start timing to the user-selected common event, or can be the common event having the maximum execution period, or can be the common event having the minimum execution period, or can be the common event having the closest execution sequence to the user-selected common event, or can be the common event that is earliest in the execution sequence, or can be the common event that is latest in the execution sequence. Alternatively, the common event selected according to the reference event selection condition information can be a common event in the same execution trace as the execution trace of the user-selected common event; and can be the common event having the closest execution start timing to the user-selected common event, or can be the common event having the closest execution sequence to the user-selected common event. Still alternatively, the selection of the common event can be done based on a user instruction acquired via a user interface. Meanwhile, the reference event selection condition information can be a condition determined in advance in a program execution status device, or can be information provided via a user interface, or can be a condition provided in a file.

As described above, according to the third embodiment, in an identical manner to the first embodiment, the execution status of a plurality of execution traces can be effectively presented to the user. Moreover, the execution status of a plurality of execution traces can be presented to the user in an interactive and effective manner. Furthermore, the execution status of an execution trace having a plurality of substantial events can be effectively presented to the user. Moreover, the execution status of an execution trace having a plurality of substantial events can be presented to the user in an interactive and effective manner.

Fourth Embodiment

Explained below in detail and with reference to the accompanying drawings is a program-execution status display device (system), which includes a display information generating device (system), according to a fourth embodiment. In the fourth embodiment, the explanation is given for an example in which, in the program-execution status display device (system) according to the second embodiment, a plurality of reference events is present in the same execution trace.

Configuration and Operations

The program-execution status display device (system) according to the fourth embodiment can have an identical configuration to the configuration of the program-execution status display device (system) 101 explained with reference to FIG. 1 according to the first embodiment. Moreover, the program-execution status display device (system) according to the fourth embodiment can have an identical outline of operations as the flowchart explained with reference to FIG. 11 according to the first embodiment.

Given below is the explanation of the details of the program-execution status display device (system) according to the fourth embodiment with reference to a specific example of a software program. However, the explanation given below is only exemplary, and the following embodiment is not limited to this example. Moreover, in the fourth embodiment, the explanation given in the second embodiment or the explanation given in the first embodiment, which is cited in the second embodiment, is cited regarding each of the following: the software program, the program execution status display, the events, the common events, the display of differences due to a plurality of execution traces, the event information, execution examples of two software programs, an example of the common event identification information, an example of the event information, variations in the event identification information, variations in the event timing information, variations in the event attribute information, the axis information, an example of the axis information, variations in the axis information, the reference event identification information, an example of the reference event identification information, the event objects, the determination of the display positions of the event objects, the determination of the display sizes of the event objects, and the generation of the event objects (including an example of generation of the reference event objects in the case in which at least two or more reference events are registered and in the case in which reference events are not registered and including an example of generation of the other event objects (including an example of generation of the event objects having common events and an example of generation of the event objects not having common events)). However, in the fourth embodiment, instead of the generation of the event information list 1201 illustrated in FIG. 12, an event information list 2001 illustrated in FIG. 20 is generated. The event information list 2001 illustrated in FIG. 20 includes sets of event information 2003, 2005, 2007, 2011, 2014, and 2017 as the sets of event information having the same common event identification information "1". Consider a case in which the reference event selecting unit 108 selects, as a reference event, the event corresponding to any one of the sets of event information 2003, 2005, 2007, 2011, 2014, and 2017; the reference-event identification information storing unit 103 has the event information about the selected event stored therein as well as has the event identification information about the selected event, from among the events holding the common event identification information "1", stored therein.

Given below is the explanation about displaying the program execution status made of the axis objects and the event objects generated according to the fourth embodiment. Examples of the display of the program execution status include a case in which reference events are not selected and a case in which reference events have been selected.

Case in which Reference Events are not Selected

Firstly, the case in which reference events are not selected is explained below with reference to a program execution status display example illustrated in FIG. 21. In the fourth embodiment, it is assumed that only the displayable range on the screen is displayed, and that the display area is changed using a scroll bar. Moreover, in the fourth embodiment, the display of axis objects is identical to the second embodiment.

The display unit 107 acquires event objects, and performs drawing based on the display position information held by the event objects. As a result, as illustrated in FIG. 21, in a program execution status display example 2101, a time-series axis object 2120 displays a label of time information in each specific section, and an attribute axis object 2121 displays attribute labels. For example, the time-series axis object 2120 displays "1" to "4", and displays the labels in units of single events. The display unit 107 acquires the display size such as the screen size or the window size, and can display the axis objects of a displayable size or can change the size of the axis objects into a displayable size before displaying them. The attribute axis object 2121 displays the label of an attribute axis element 2122 and the label of an attribute axis element 2123. Moreover, in the program execution status display example 2101, event objects representing the sets of event information 2002, 2003, 2004, 2005, 2010, 2011, 2012, and 2013 are displayed in that order as event objects 2102, 2103, 2104, 2105, 2110, 2111, 2112, and 2113, respectively.

Case in which Reference Events have been Selected

Figure 22:
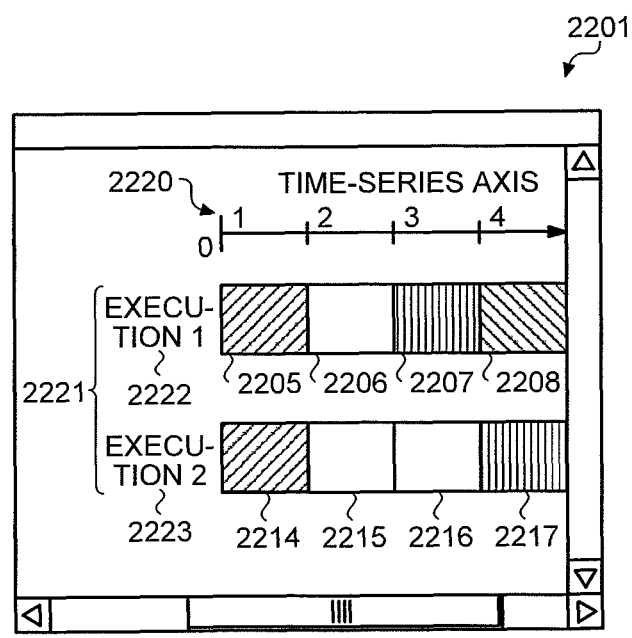
FIG. 22 is a diagram illustrating another program execution status display example according to the fourth embodiment.

The case in which reference events have been selected is explained below with reference to a program execution status display example illustrated in FIG. 22. In the fourth embodiment, it is assumed that only the displayable range on the screen is displayed, and that the display area is changed using a scroll bar. Moreover, in the fourth embodiment, the display of axis objects is identical to the second embodiment.

The display unit 107 acquires the reference event objects, and performs drawing based on the display position information held by the reference event objects. As a result, as illustrated in FIG. 22, in a program execution status display example 2201, a time-series axis object 2220 displays a label of time information in each specific section, and an attribute axis object 2221 displays attribute labels. For example, the time-series axis object 2220 displays "1" to "4", and displays the labels in units of single events. The display unit 107 acquires the display size such as the screen size or the window size, and can display the axis objects of a displayable size or can change the size of the axis objects into a displayable size before displaying them. The attribute axis object 2221 displays the label of an attribute axis element 2222 and the label of an attribute axis element 2223. Moreover, in the program execution status display example 2201, event objects representing the sets of event information 2005, 2006, 2007, 2008, 2014, 2015, 2016, and 2017 are displayed in that order as event objects 2205, 2206, 2207, 2208, 2214, 2215, 2216, and 2217, respectively.

Specific Example

Figure 21:
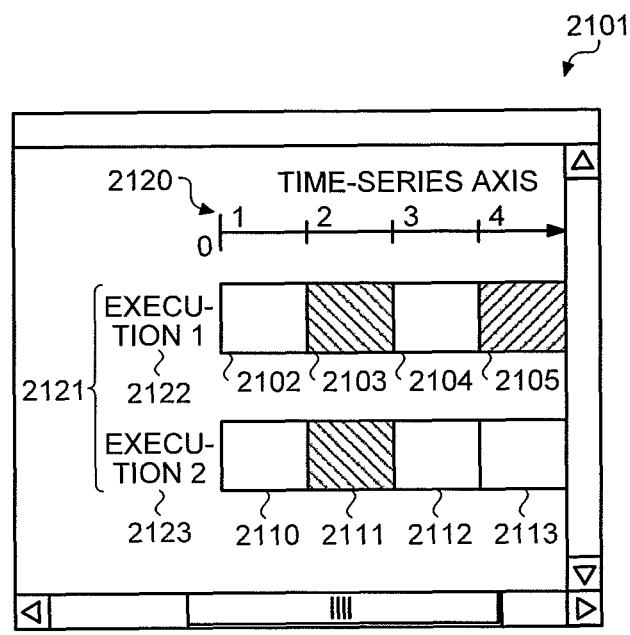
FIG. 21 is a diagram illustrating a program execution status display example according to the fourth embodiment.

More particularly, in the program execution status display example 2101 illustrated in FIG. 21, the events 2103, 2105, and 2111 having common events are displayed as objects using a color other than "gray" color. However, as the unique display format, if a display format other than a color, such as a type of hatching or a type of drawing lines, is implemented; then the event objects can be displayed using the implemented display format that is different than the display format of non-common events not holding the common event identification information. If the event object 2105 is selected using a user interface such as a mouse, then the reference event selecting unit 108 extracts the common event identification information "1" and the execution trace identification information "1" from the event information 2005 of the event object 2105. Then, from the event information list 2001, the reference event selecting unit 108 selects the sets of event information 2011, 2014, and 2017, which have the execution trace identification information other than "1" and which have the common event identification information "1", as the reference events. In the selected sets of event information, if there is a plurality of sets of event information having the same execution trace identification information, then the reference event selecting unit 108 selects a single piece of event information for each piece of execution trace identification information. In this specific example, based on reference event selection condition information, from among the sets of event information 2011, 2014, and 2017, the event represented by the event information 2014, which has the execution sequence information "4" that is closest to the execution sequence information "4" of the event information 2005 selected as the reference event in another execution trace, is selected as the reference event. As a result, in the reference-event identification information storing unit 103, the event identification information "3" of the event information 2005 and the event identification information "12" of the event information 2014 are stored as sets of the reference event identification information.

Meanwhile, in the fourth embodiment, the variations in the reference event selection method and the variations in the reference event selection condition information can be identical to the third embodiment.

As described above, according to the fourth embodiment, in an identical manner to the first embodiment, the execution status of a plurality of execution traces can be effectively presented to the user. Moreover, the execution status of a plurality of execution traces can be presented to the user in an interactive and effective manner. Furthermore, the execution status of an execution trace having a plurality of substantial events can be effectively presented to the user. Moreover, the execution status of an execution trace having a plurality of substantial events can be presented to the user in an interactive and effective manner.

In addition, the above-described units constituting the program-execution status display device (system) according to each of the embodiments can be realized using one or more data processing devices such as CPUs (central processing unit) and/or one or more memories.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display information generating device that generates information to display a first program execution result comprising two or more events and a second program execution result comprising two or more events side by side with respect to a common time-series axis, the display information generating device comprising:
    an event object generating unit that generates event objects which represent the events; and
    an axis object generating unit that generates a time-series axis object which represents the common time-series axis; wherein
    the event object generating unit
        sets a first reference event being one of the events as a reference for the first program execution result based on first-reference-event identification information to be used in identifying the first reference event,
        sets a second reference event being another one of the events as a reference for the second program execution result based on second-reference-event identification information to be used in identifying the second reference event,
        based on timing information indicative of positions of the events in the first program execution result or the second program execution result, determines display positions of the first reference event and the second reference event with respect to the common time-series axis to be same position, and
        based on the determined display positions with respect to the common time-series axis, generates the first event object and the second event object.

2. A program-execution status display system that displays a first program execution result comprising two or more events and a second program execution result comprising two or more events side by side with respect to a common time-series axis, the program-execution status display system comprising:
    an event object generating unit that generates event objects which represent the events; and
    an axis object generating unit that generates a time-series axis object which represents the common time-series axis; wherein
    the event object generating unit
        sets a first reference event being one of the events as a reference for the first program execution result based on first-reference-event identification information to be used in identifying the first reference event,
        sets a second reference event being another one of the events as a reference for the second program execution result based on second-reference-event identification information to be used in identifying the second reference event,
        based on timing information indicative of positions of the events in the first program execution result or the second program execution result, determines display positions of the first reference event and the second reference event with respect to the common time-series axis to be same position, and
        based on the determined display positions with respect to the common time-series axis, generates the first event object and the second event object.

3. The program-execution status display system according to claim 2, wherein the first reference event and the second reference event are common events having at least a single common point therebetween.

4. The program-execution status display system according to claim 3, wherein the event object generating unit
    determines, based on a first display position of the first reference event, based on a first timing information included in first event information about the events included in the first program execution result, and based on timing information included in event information about a first event that is a different event than the first reference event in the first program execution result, a display position of the first event, and
    determines, based on a second display position of the second reference event, based on a second timing information included in second event information about the events included in the second program execution result, and based on timing information included in event information about a second event that is a different event than the second reference event in the second program execution result, a display position of the second event.

5. The program-execution status display system according to claim 3, wherein
    the axis object generating unit generates, using time-series axis information which represents information about the common time-series axis, the common time-series axis object,
    the time-series axis information contains a display range of the common time- series axis and a unit of display of the common time-series axis,
    the axis object generating unit generates the time-series axis object based on the display range and the unit of display included in the time-series axis information, and
    based on the display range and the unit of display included in the time-series axis information, the event object generating unit determines the display position of the first reference event as well as the display position of the second reference event to be a position serving as a reference for the common time-series.

6. The program-execution status display system according to claim 3, wherein
the event object generating unit acquires event information contains common event identification information that indicates whether or not there exists a common event which has at least a single common point with respect to the events represented by the event information, and
based on the common event identification information, the event object generating unit generates the event object in such a way that an event having a common event is displayed in a different display method than an event not having a common event.

7. The program-execution status display system according to claim 6, wherein, based on the common event identification information, the event object generating unit generates the event object in such a way that same common events are displayed in same display method.

8. The program-execution status display system according to claim 3, further comprising:
a reference event selecting unit that selects the first reference event and the second reference event; and
a reference-event identification information updating unit that generates the reference event identification information based on the selected first and second events, wherein
the event object generating unit acquires event information which contains common event identification information that indicates whether or not there exists a common event which has at least a single common point with respect to the events represented by the event information, and execution trace identification information that enables identification of events executed in same program execution,
the reference event selecting unit
selects the first reference event having at least a single common event, and
selects, as the second reference event, an event having event information which contains same common event identification information as common event identification information included in first event information about the first reference event but which contains different execution trace identification information than execution trace identification information included in the first event information, and
the reference-event identification information updating unit generates the reference event identification information, which enables identification of the first reference event and the second reference event which have been selected.

9. The program-execution status display system according to claim 8, wherein
the reference event selecting unit
selects two or more events having event information which contains same common event identification information as common event identification information included in the first event information about the first reference event but which contains different execution trace identification information than execution trace identification information included in the first event information, and
selects the second reference event from the two or more selected events based on the event information, and
the reference-event identification information updating unit generates the reference event identification information, which enables identification of the first reference event and the second reference event which have been selected.

10. The program-execution status display system according to claim 2, further comprising a display that displays the event objects side by side with respect to the common time-series axis.

11. A program-execution status display method for displaying a first program execution result comprising two or more events and a second program execution result comprising two or more events side by side with respect to a common time-series axis,
wherein the program-execution status display method is implemented using an event object generating unit that generates event objects which represent the events, and
an axis object generating unit that generates a common time-series axis abject which represents a common time-series axis,
wherein the program-execution status display method comprising:
setting, by the event object generating unit, a first reference event being one of the events as a reference for the first program execution result based first-reference-event identification information to be used in identifying the first reference event;
setting, by the event object generating unit, a second reference event being another one of the events as a reference for the second program execution result based on second-reference-event identification information to be used in identifying the second reference event;
determining, by the event object generating unit, based on timing information indicative of positions of the events in the first program execution result or the second program execution result, display positions of the first reference event and the second reference event with respect to the common time-series axis to be same position;
generating, by the event object generating unit, based on the determined display positions with respect to the common time-series axis, the first event object and the second event object; and
displaying the first event object and the second event object side by side with respect to the common time-series axis.

12. A computer program product having a non-transitory computer readable medium including programmed instructions that generates information to display a first program execution result comprising two or more events and a second program execution result comprising two or more events side by side with respect to a common time-series axis,
wherein the instructions, includes
an event object generating unit that generates event objects which represent the events, and
an axis object generating unit that generates a common time-series axis object which represents a common time-series axis,
wherein the instructions cause the computer to execute:
setting, by the event object generating unit, a first reference event being one of the events as a reference for the first program execution result based on first-reference-event identification information to be used in identifying the first reference event;
setting, by the event object generating unit, a second reference event being another one of the events as a reference for the second program execution result based on second-reference-event identification information to be used in identifying the second reference event;
determining, by the event object generating unit, based on timing information indicative of positions of the events in the first program execution result or the second program execution result, display positions of the first reference event and the second reference event with respect to the common time-series axis to be same position; and
generating, by the event object generating unit, based on the determined display positions with respect to the common time-series axis, the first event object and the second event object.

\* \* \* \* \*